United States Patent
Elbsat et al.

(10) Patent No.: US 12,436,528 B2
(45) Date of Patent: Oct. 7, 2025

(54) BUILDING MANAGEMENT SYSTEM WITH SUPERVISORY FAULT DETECTION LAYER

(71) Applicant: Johnson Controls Tyco IP Holdings LLP, Milwaukee, WI (US)

(72) Inventors: Mohammad N. Elbsat, Milwaukee, WI (US); Michael J. Wenzel, Oak Creek, WI (US); Jingduo Fan, Milwaukee, WI (US); Joshua D. Carl, Milwaukee, WI (US); Robert D. Turney, Watertown, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 470 days.

(21) Appl. No.: 17/389,085

(22) Filed: Jul. 29, 2021

(65) Prior Publication Data
US 2022/0035357 A1 Feb. 3, 2022

Related U.S. Application Data

(60) Provisional application No. 63/058,695, filed on Jul. 30, 2020.

(51) Int. Cl.
*G05B 23/02* (2006.01)
*G05B 15/02* (2006.01)
(Continued)

(52) U.S. Cl.
CPC ........... *G05B 23/024* (2013.01); *G05B 15/02* (2013.01); *G06N 3/045* (2023.01); *G06N 5/04* (2013.01)

(58) Field of Classification Search
CPC .... G05B 23/024; G05B 15/02; G06N 3/0454; G06N 5/04
See application file for complete search history.

(56) References Cited

U.S. PATENT DOCUMENTS

| | | | |
|---|---|---|---|
| 7,536,595 B1 * | 5/2009 | Hiltunen | G06F 11/0793 714/26 |
| 2003/0018928 A1 * | 1/2003 | James | G05B 23/0254 714/E11.158 |

(Continued)

FOREIGN PATENT DOCUMENTS

| | | |
|---|---|---|
| EP | 1 156 286 A2 | 11/2001 |
| WO | WO-2012/161804 A1 | 11/2012 |
| WO | WO-2013/130956 A1 | 9/2013 |

OTHER PUBLICATIONS

Afram et al., "Theory and Application of HVAC Control Systems—A review of Model Predictive Control (MPC)," Building and Environment, Feb. 2014, vol. 72 (pp. 343-355).

(Continued)

*Primary Examiner* — Arleen M Vazquez
*Assistant Examiner* — Lyudmila Zaykova-Feldman
(74) *Attorney, Agent, or Firm* — Foley & Lardner LLP

(57) ABSTRACT

A method for detecting faults in a building management system (BMS) is shown. The method includes receiving time series data characterizing an operating performance of one or more BMS devices. The method further includes processing the time series data using multiple different fault detection methods to generate multiple fault detection results. The method includes providing the multiple fault detection results as outputs from the multiple different fault detection methods. The method includes applying the multiple fault detection results as inputs to a neural network that determines whether the multiple fault detection results are indicative of a fault condition in the BMS.

16 Claims, 24 Drawing Sheets

(51) Int. Cl.
  G06N 3/045  (2023.01)
  G06N 5/04   (2023.01)

(56) References Cited

U.S. PATENT DOCUMENTS

| | | | |
|---|---|---|---|
| 2003/0055798 A1 | 3/2003 | Hittle et al. | |
| 2008/0294578 A1* | 11/2008 | de Kleer | G06F 11/2257 706/12 |
| 2009/0300417 A1* | 12/2009 | Bonissone | G05B 23/0254 714/E11.178 |
| 2011/0022891 A1* | 1/2011 | Fijany | G06F 11/3608 714/E11.029 |
| 2012/0022700 A1* | 1/2012 | Drees | G05B 15/02 705/412 |
| 2012/0089872 A1* | 4/2012 | Bartenstein | G06F 11/2205 714/33 |
| 2012/0166363 A1* | 6/2012 | He | G06N 3/0409 706/2 |
| 2012/0185728 A1* | 7/2012 | Guo | F24F 11/38 714/E11.159 |
| 2012/0259583 A1* | 10/2012 | Noboa | H02J 13/00016 702/179 |
| 2013/0226498 A1* | 8/2013 | Pedersen | G06F 11/0751 702/117 |
| 2014/0058572 A1* | 2/2014 | Stein | G06Q 50/06 700/291 |
| 2014/0142760 A1* | 5/2014 | Drees | H02J 13/00016 700/275 |
| 2014/0316743 A1* | 10/2014 | Drees | H02J 13/00016 702/183 |
| 2015/0113649 A1* | 4/2015 | Angelov | G06F 11/0751 726/23 |
| 2016/0203036 A1* | 7/2016 | Mezic | G06F 11/0751 714/819 |
| 2018/0046149 A1* | 2/2018 | Ahmed | G05B 13/026 |
| 2018/0046173 A1* | 2/2018 | Ahmed | F24F 11/30 |
| 2018/0183823 A1* | 6/2018 | Fadlil | G06F 11/00 |
| 2018/0285831 A1* | 10/2018 | Meruva | G06Q 10/1097 |
| 2019/0026359 A1* | 1/2019 | Park | G10L 15/14 |
| 2019/0041811 A1* | 2/2019 | Drees | G05B 13/027 |
| 2019/0094286 A1* | 3/2019 | Becher | G06N 3/0454 |
| 2019/0346817 A1* | 11/2019 | Perez | G01M 99/00 |
| 2019/0391573 A1* | 12/2019 | Wang | G05B 15/02 |
| 2020/0210873 A1* | 7/2020 | Cantwell | G06F 11/0751 |
| 2020/0301408 A1 | 9/2020 | Elbsat et al. | |
| 2021/0109511 A1* | 4/2021 | Kumano | G05B 19/41885 |
| 2023/0094389 A1* | 3/2023 | You | G06N 5/01 706/62 |

OTHER PUBLICATIONS

Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
EPO Search Opinion EP Appl. Ser. No. EP 22177772.5 dated Sep. 26, 2022 (6 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke

(56) References Cited

OTHER PUBLICATIONS

Universiteit Leuven—Faculty of Engineering Celestijnenlaan : 300A box 2421, B-3001 Heverlee (Belgium) Apr. 20, 2012 (316 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

\* cited by examiner

```
numHiddenUnits1 - 100;
numHiddenUnits2 = 20;
numHiddenUnits3 = 3;
layers = [...
    sequenceinputLayer(S)
    lstmLayer(numHiddenUnits1,'OutputMode','sequence')
    dropoutLayer(0.2)
    lstmLayer(numHiddenUnits2,'OutputMode','sequence')
    fullyconnectedLayer(numHiddenUnits3);
    lstmLayer(numHiddenUnits2,'OutputMode','sequence')
    dropoutLayer(0.2)
    lstmLayer(numHiddenUnits1,'OutputMode','sequence')
    fullyConnectedLdyer(numResponses)
    regressionLayer];
```

BUILDING MANAGEMENT SYSTEM WITH SUPERVISORY FAULT DETECTION LAYER

CROSS REFERENCE TO RELATED APPLICATION

This application claims the benefit and priority to U.S. Provisional Application No. 63/058,695, filed Jul. 30, 2020, incorporated herein by reference in its entirety.

BACKGROUND

The present disclosure relates to building control systems. More particularly, the present disclosure relates to making fault control decisions based on various methods of detecting fault conditions within a building heating, ventilation, or air conditioning (HVAC) system.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method for detecting faults in a building management system (BMS). The method includes receiving time series data characterizing an operating performance of one or more BMS devices. The method further includes processing the time series data using multiple different fault detection methods to generate multiple fault detection results. The method includes providing the multiple fault detection results as outputs from the multiple different fault detection methods. The method includes applying the multiple fault detection results as inputs to a neural network that determines whether the multiple fault detection results are indicative of a fault condition in the BMS.

In some embodiments, processing the time series data using the multiple different fault detection methods includes using an artificial intelligence (AI) fault detection method includes determining an expected value of the time series data based on inferences made by a second neural network, calculating a residual value between an actual value of the time series data and the expected value of the time series data, generating statistical inferences based on the residual value, and providing the statistical inferences as one of the fault detection results.

In some embodiments, generating statistical inferences based on the residual value includes generating at least one of a mean squared error of the residual value or a determinant of a covariance of the residual value.

In some embodiments, processing the time series data using the multiple different detection methods includes using a peer fault detection method to identify whether the one or more BMS devices operating atypically by generating a model of typical operation of the one or more BMS devices, comparing the time series data to the model of typical operation to determine whether the one or more BMS devices are operating atypically, the time series data including operational data relating to the one or more BMS devices, and providing one of the fault detection results in response to determining that the one or more BMS devices are operating atypically.

In some embodiments, generating the statistical inferences based on the residual value includes generating a cumulated sum (CUSUM) of the time series data or cumulated sum squared (CUSUMSQ) of the time series data or a recursive residual of the time series data.

In some embodiments, the neural network is at least one of: a feed forward neural network, a convolutional neural network, a long short term neural network, or a recurrent neural network.

In some embodiments, the neural network is trained using historical user confirmed faults and the multiple fault detection results.

In some embodiments, applying the multiple fault detection results as inputs to a neural network includes adding additional inputs of at least one of an outdoor environmental condition, day of the week, or time of day.

In some embodiments, processing the time series data using the multiple different detection methods includes using a peer fault detection method to identify whether the one or more BMS devices operate atypically by calculating one or more performance metrics of the one or more devices, calculating device statistics for each of the one or more devices, determining the device statistics exceed a critical value, and providing one of the fault detection results in response to determining that the one or more device statistics of the BMS have exceeded the critical value.

In some embodiments, applying the multiple fault detection results includes applying once or more instances of a fault in real-time or one or more instances of a timeseries of results, or a combination of both.

Another implementation of the present disclosure is one or more non-transitory computer-readable media having computer-executable instructions stored thereon that, when executed by one or more processors, cause the one or more processors to perform operations. The operations include receiving time series data characterizing an operating performance of one or more BMS devices. The operations include processing the time series data using multiple different fault detection methods to generate multiple fault detection results. The operations include providing the multiple fault detection results as outputs from the multiple different fault detection methods. The operations include applying the multiple fault detection results as inputs to a neural network that determines whether the multiple fault detection results are indicative of a fault condition in the BMS.

In some embodiments, processing the time series data using the multiple different fault detection methods includes using an artificial intelligence (AI) fault detection method including determining an expected value of the time series data based on inferences made by a second neural network, calculating a residual value between an actual value of the time series data and the expected value of the time series data, generating statistical inferences based on the residual value, and providing the statistical inferences as one of the fault detection results.

In some embodiments, generating statistical inferences based on the residual value includes generating at least one of a mean squared error of the residual value or a determinant of a covariance of the residual value.

In some embodiments, processing the time series data using the multiple different fault detection methods includes using a temporal detection method including determining an expected value of the time series data based on inferences made by a regression model, calculating a residual value between an actual value of the time series data and the expected value of the time series data, generating statistical inferences based on the residual value, and providing the statistical inferences as one of the fault detection results.

In some embodiments, generating the statistical inferences based on the residual value includes generating a cumulated sum (CUSUM) of the time series data or cumulated sum squared (CUSUMSQ) of the time series data or a recursive residual of the time series data.

In some embodiments, processing the time series data using the multiple different detection methods includes using a peer fault detection method to identify whether the one or more BMS devices operating atypically by generating a model of typical operation of the one or more BMS devices, comparing the time series data to the model of typical operation to determine whether the one or more BMS devices are operating atypically, the time series data including operational data relating to the one or more BMS devices, and providing one of the fault detection results in response to determining that the one or more BMS devices are operating atypically.

Another implementation of the present disclosure controller including one or more processors and memory storing instructions that, when executed by the one or more processors, cause the one or more processors to perform operations. The operations include receiving time series data characterizing an operating performance of one or more BMS devices, processing the time series data using multiple different fault detection methods to generate multiple fault detection results, providing the multiple fault detection results as outputs from the multiple different fault detection methods, and applying the multiple fault detection results as inputs to a neural network that determines whether the multiple fault detection results are indicative of a fault condition in the BMS.

In some embodiments, processing the time series data using the multiple different fault detection methods includes using an artificial intelligence (AI) fault detection method including determining an expected value of the time series data based on inferences made by a second neural network, calculating a residual value between an actual value of the time series data and the expected value of the time series data, generating statistical inferences based on the residual value, and providing the statistical inferences as one of the fault detection results.

In some embodiments, the processing circuit is further configured to, in response to determining that the multiple fault detection results are indicative of the fault condition in the BMS, provide a notification to a building interface.

BRIEF DESCRIPTION OF THE DRAWINGS

FIG. 11 is a portion of code for generating at least a portion of a neural network is shown, which can be implemented by the controller of FIG. 6, according to some embodiments.

DETAILED DESCRIPTION

Overview

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, systems and methods for detecting faults in a heating, ventilation, or air conditioning (HVAC) system are shown, according to exemplary embodiments. In some embodiments, time series data is received that provides information related to operation of various HVAC devices. A building controller may receive the time series data and determine, via several fault detection methods, several fault detection indications based on the time series data. A supervisory layer with neural network functionality may receive these fault detection indications and make a final control decision based on the several fault detection indications, a priori information related to the HVAC system, models generated by the neural network functionality, or any combination thereof.

Building Management System and HVAC System

Building Site

Figure 1:
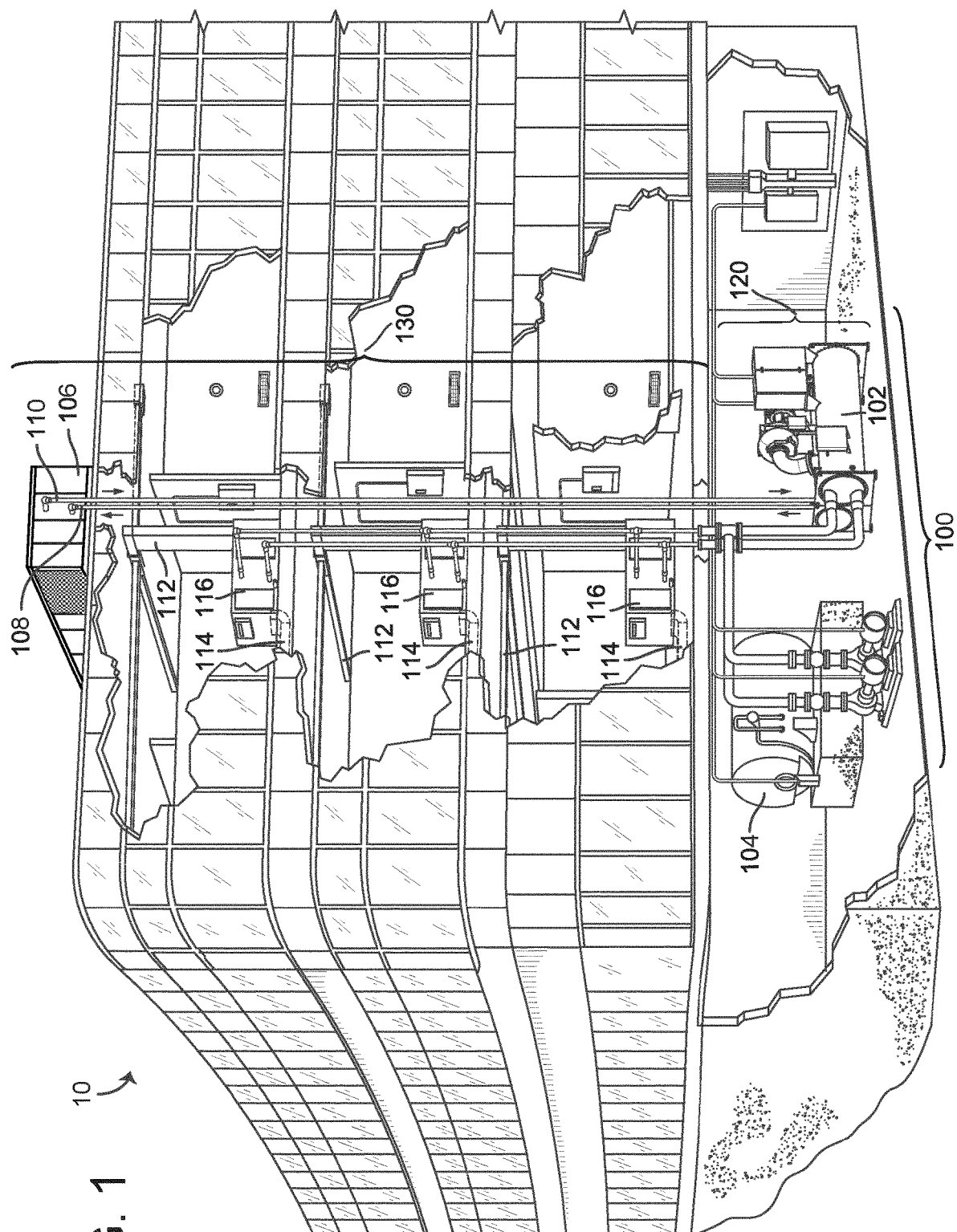
FIG. 1 is a drawing of a building with a heating, ventilation, or air conditioning (HVAC) system, according to some embodiments.

Referring now to FIG. 1, a perspective view of a building 10 is shown. Building 10 is served by a building management system (BMS). A BMS is, in general, a system of devices configured to control, monitor, and manage equipment in or around a building or building area.

A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
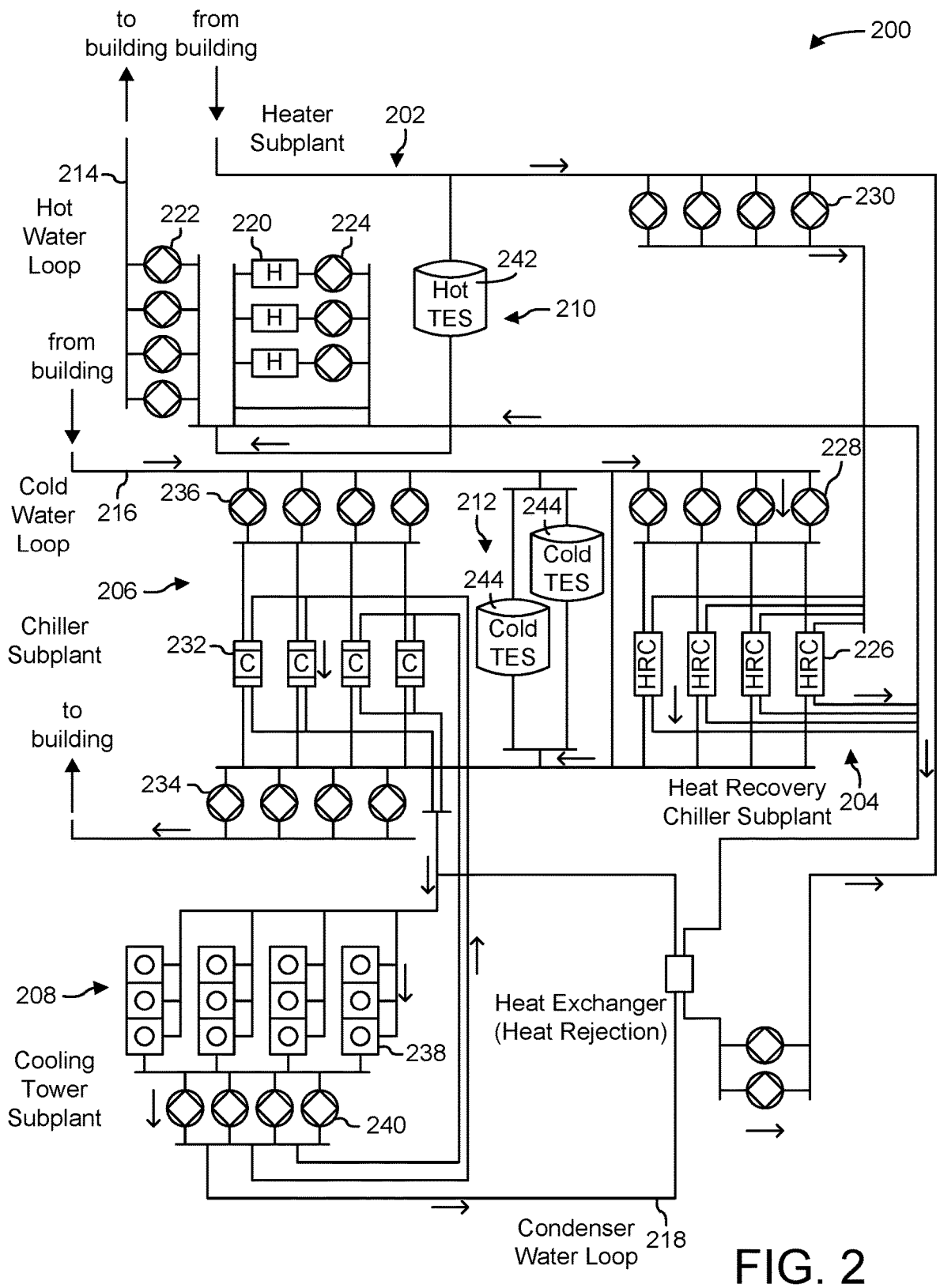
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
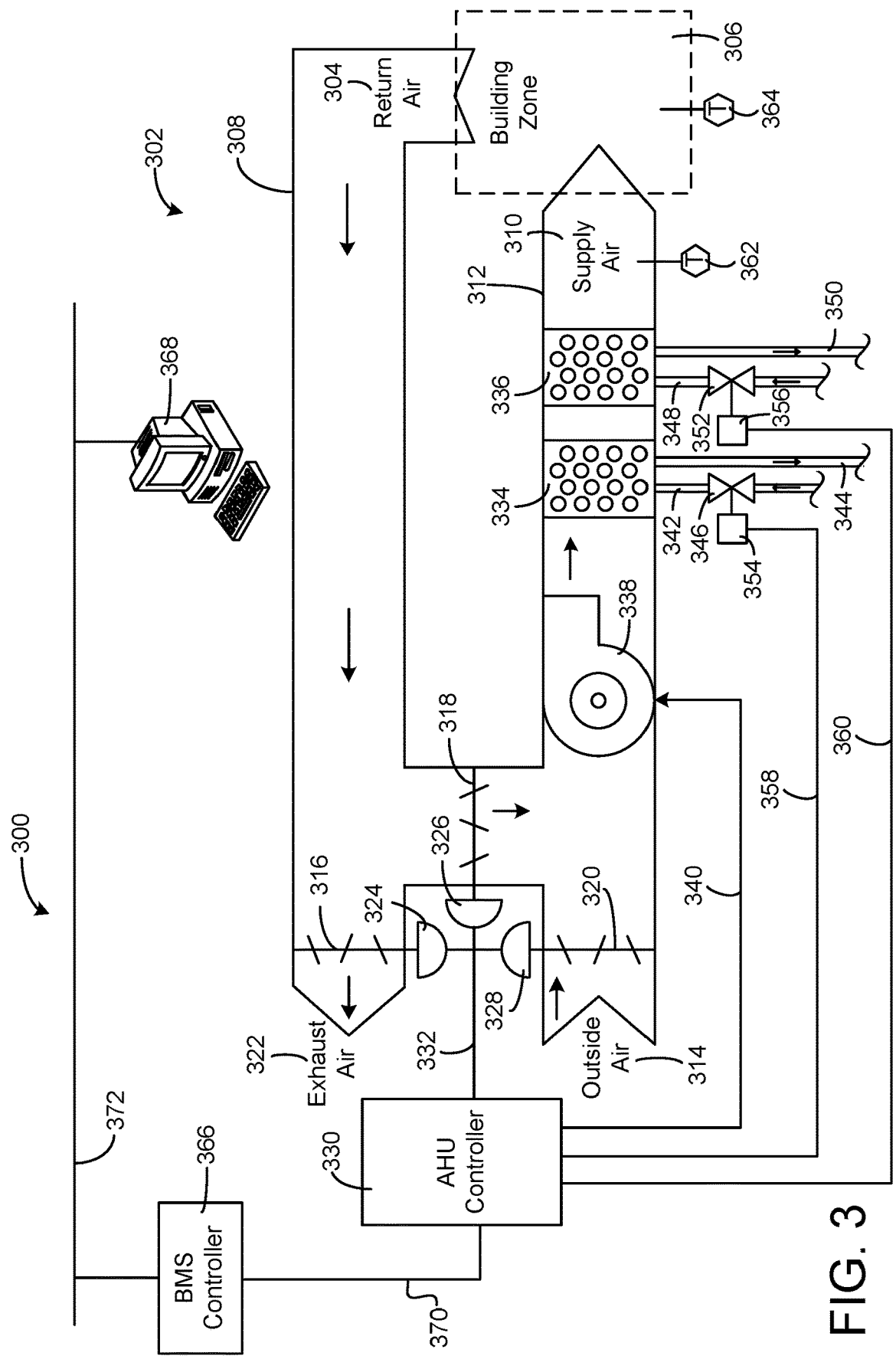
FIG. 3 is a diagram of an airside system, which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
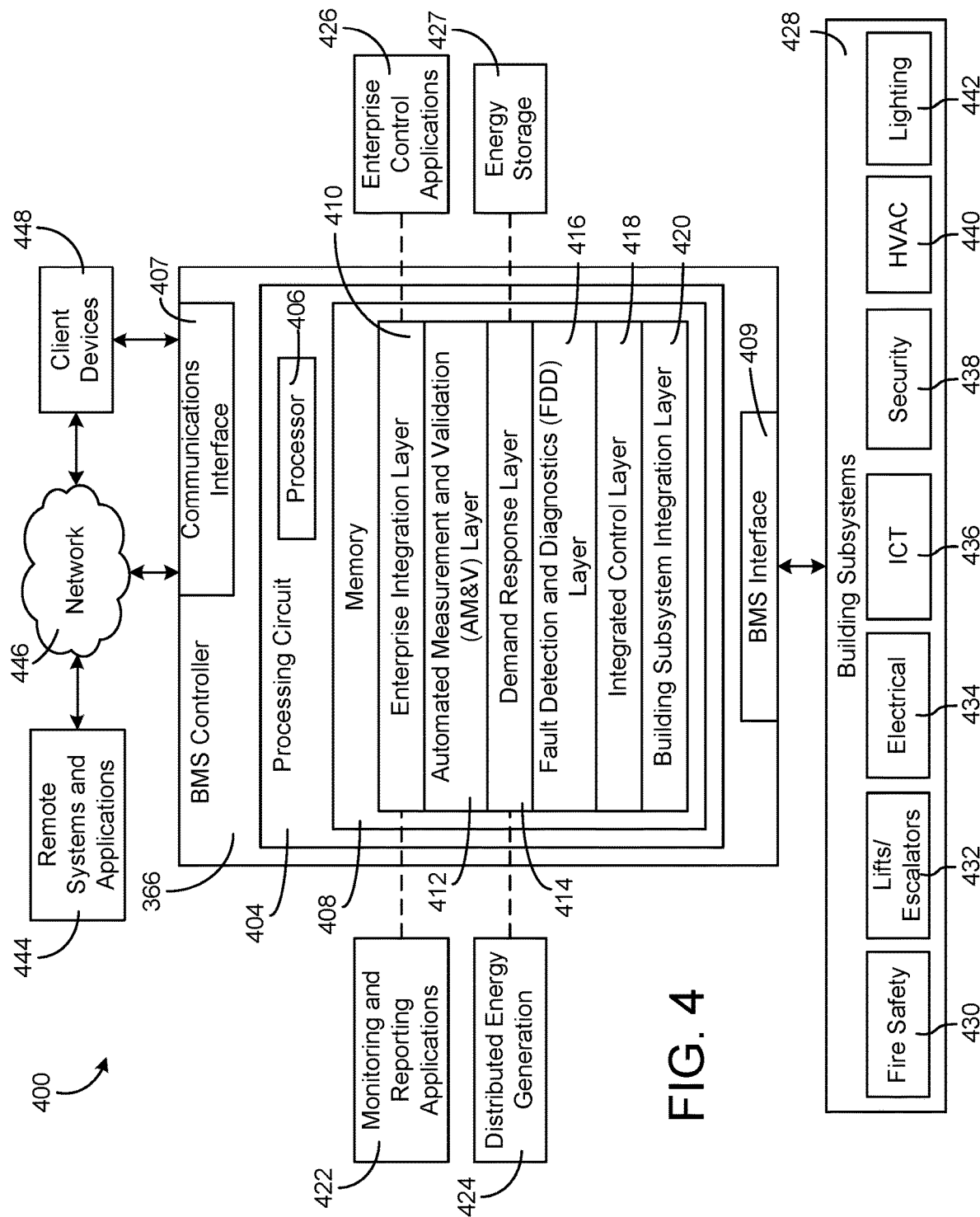
FIG. 4 is a block diagram of a building management system (BMS) which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing set points, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing set points) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what set points can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Fault Detection System

System Architecture

Figure 5:
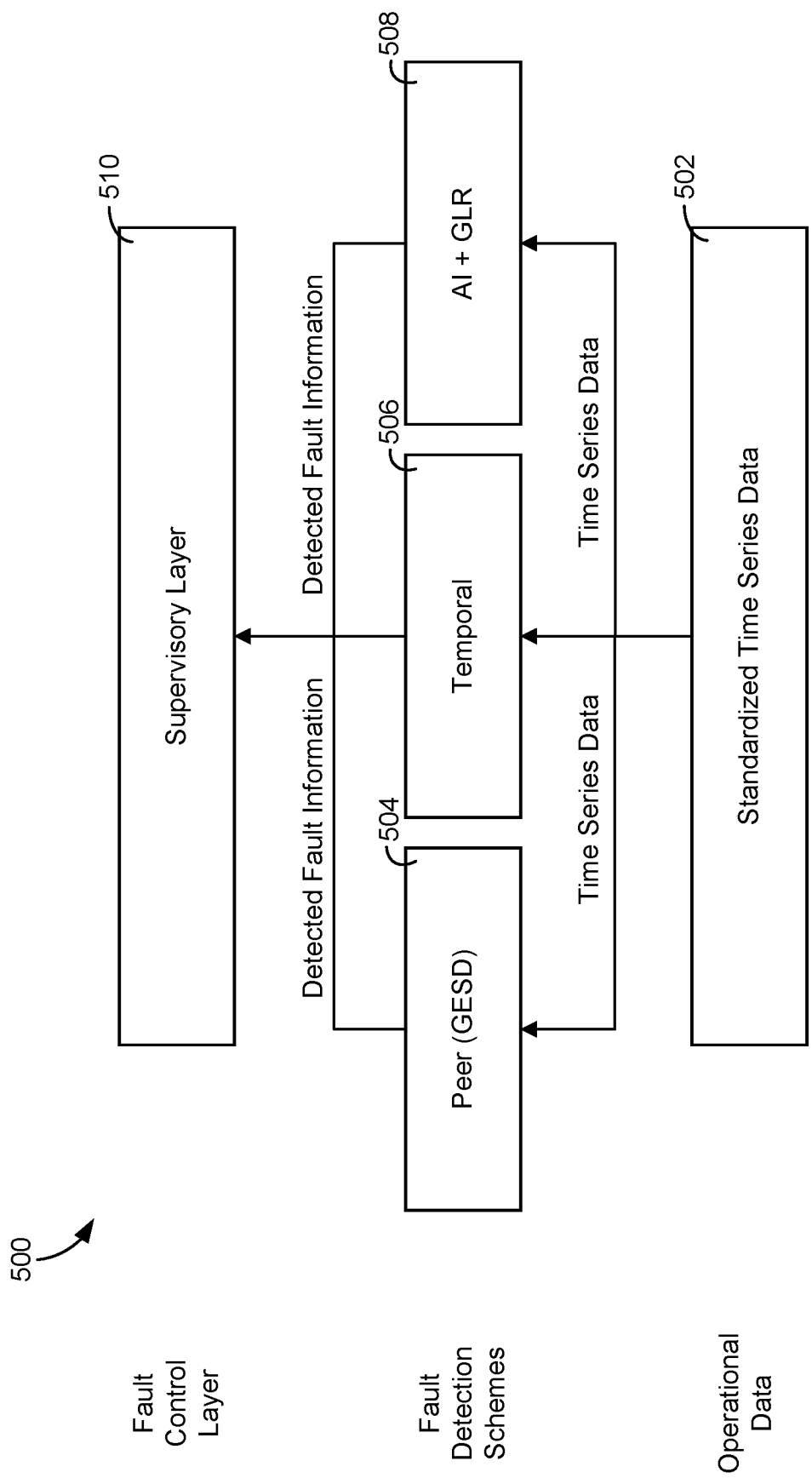
FIG. 5 is block diagram of a system architecture for detecting faults, which can be performed by the BMS controller of FIG. 4, according to some embodiments.

Referring now to FIG. 5, system 500 for determining fault conditions in a control system based on one or more fault indicators is shown, according to exemplary embodiments. System 500 may make control decisions based a determination for whether a fault has been detected within an HVAC system (e.g., system 100, central plant 200, airside system 300, BMS 400. In some embodiments, system 500 determines not only whether a fault has been detected, but also the type, criticality, location, or other parameters related to the fault. System 500 may be configured to receive data relating to operation of HVAC system 100, determine several fault detections (e.g., via temporal detection, via peer detection, via AI+Generalized Likelihood Ratio (GLR) detection, etc.). Then, system 500 may make control decisions based on the received control detections. System 500 is shown to include standardized time series data ("data") 502, Peer (GESD) ("peer detection method") 504, temporal ("temporal detection method") 506, AI+GLR ("AI detection method") 508, and supervisory layer 510.

Data 502 may be configured to provide various operational data to a controller (e.g., BMS controller 366, controller 602 described below, a controller implementing the processes for peer detection method 504, temporal detection method 506, or AI detection method 508, etc.). Data 502 may include time series data, wherein the data is a series of data points indexed in time order. The time series data may be a sequence taken at successive equally spaced points in time (e.g., 5 ms, 50 ms, 500 ms, etc.) and is thus a sequence of discrete-time data. In some embodiments, data 502 includes information relating to compressor speeds, compressor current, pump speeds, power out, power input, operating voltage, operating current, pump pressure, and temperature measurements. These types of a data are meant to be exemplary and are not intended to be limiting. As such, data 502 may include significantly more types of data relating to equipment (e.g., boilers, chillers, pumps, compressors, VAV boxes, AHU's, etc.) operation within HVAC system 100.

In some embodiments, data 502 is sent simultaneously (e.g., several data sets are sent at the same time). For example, the pump speed, pump pressure, operating voltage, and temperature of pumps 222 and 224 are provided at the same time to a controller. In other embodiments, data 502 is sent discreetly (e.g., one piece of data at a time). In some embodiments, data 502 will have a constant mean and variance, except for when a fault is injected into the data. Because the incoming data has constant mean and variance, the incoming data will be standardized (e.g., converted to zero mean and unit variance using the equation: $x_{std}=(x_{in}-\bar{x})/\sigma$, where $\bar{x}$ is the mean, and $\sigma$ is the standard deviation, etc.) before being sent to the detection schemes (e.g., peer detection method 504 or temporal detection method 506 or AI detection method 508, etc.).

Data 502 may typically be implemented as floating point numbers, however data 502 may include any type of data formatting typically found in computing (e.g., Not a Number (NaN), integer, fixed point, double, single precision, double precision, etc.). In some embodiments, data 502 will be received and analyzed in a "sliding window" approach, where new data 502 will be added to the detection scheme, and old data will be "forgotten" after a period of time (e.g., 100 ms, 1 minute, 10 minutes, 1 hour, 1 day, 1 year, etc.) such that the detection window will "slide" through time. This may be necessary to support the time series nature of the data, and to support detection over a very long period of time (e.g., years), without loss of accuracy.

Peer detection method 504 (and similarly temporal detection method 506 and AI detection method 508) may be various processes and/or methods implemented by a building controller to detect and determine faults in a system. Peer detection method 504 is shown to receive time series data from data 502 and provide detected fault information to supervisory layer 510. In some embodiments, peer detection method 504 is one method for detecting faults considered by system 500, wherein multiple different methods for detecting faults are considered. Then the detected fault information is weighed against other methods that have provided detected fault information to supervisory layer 510 to determine the most accurate fault detection information and appropriate control response.

In some embodiments, peer detection method 504 is configured to identify which HVAC devices in a system (e.g., HVAC system 100) are operating differently than the other HVAC devices. For example, peer detection method 504 may consider past operational data of several AHU's operating in system 100. Based on the a priori operational information, peer detection method 504 may be able to determine that one of the several AHU's is malfunctioning based on its received operational data being distinctly different (e.g., an outlier) than the other AHU's operational data. Peer detection method 504 is described in greater detail below with reference to FIG. 6.

Temporal method 506 may be another detection method considered by supervisory layer 510. In some embodiments, temporal method 506 is configured to calculate one or more linear regression coefficients at each time step of the provided data 502 (e.g., time series data). Temporal method 506 may then monitor how those coefficients change over time. Temporal method 506 is described in greater detail below with reference to FIG. 6.

AI detection method 508 may be another detection method considered by supervisory layer 510. AI detection method 508 may be configured to use an auto-encoder neural network (NN) as a control model to calculate an output of the system. In some embodiments, output of the NN and the measured output are provided to a statistic calculator. The calculator may then produce a single number (e.g., a GLR statistic, etc.) which is provided to supervisory layer 510 and used to determine if there is a fault. AI detection method is described in greater detail below with reference to FIG. 6.

In some embodiments, the detected fault information provided by some or all of the elements 504-508 can include current fault information, fault information determined over a time horizon, or any combination thereof. In some embodiments, fault adaptive controller 602 (e.g., via supervisory layer 510, etc.) may be configured to provide alarms and/or notifications to one or more interfaces (e.g., terminal of a building technician, etc.) in response to analytics from supervisory layer 510. For example, if a fault is detected, a notification including the intensity of the alarm, the type of the alarm, and/or the probability of the alarm (e.g., 100% guarantee, binary 1 output, 35% chance of alarm, etc.). The notifications can be provided to any type of interface within building 10 or otherwise connected with BMS 400, such as smartphone interfaces, building workstations, tablets, computer terminals, and other processing devices.

Fault Adaptive Controller

Figure 6:
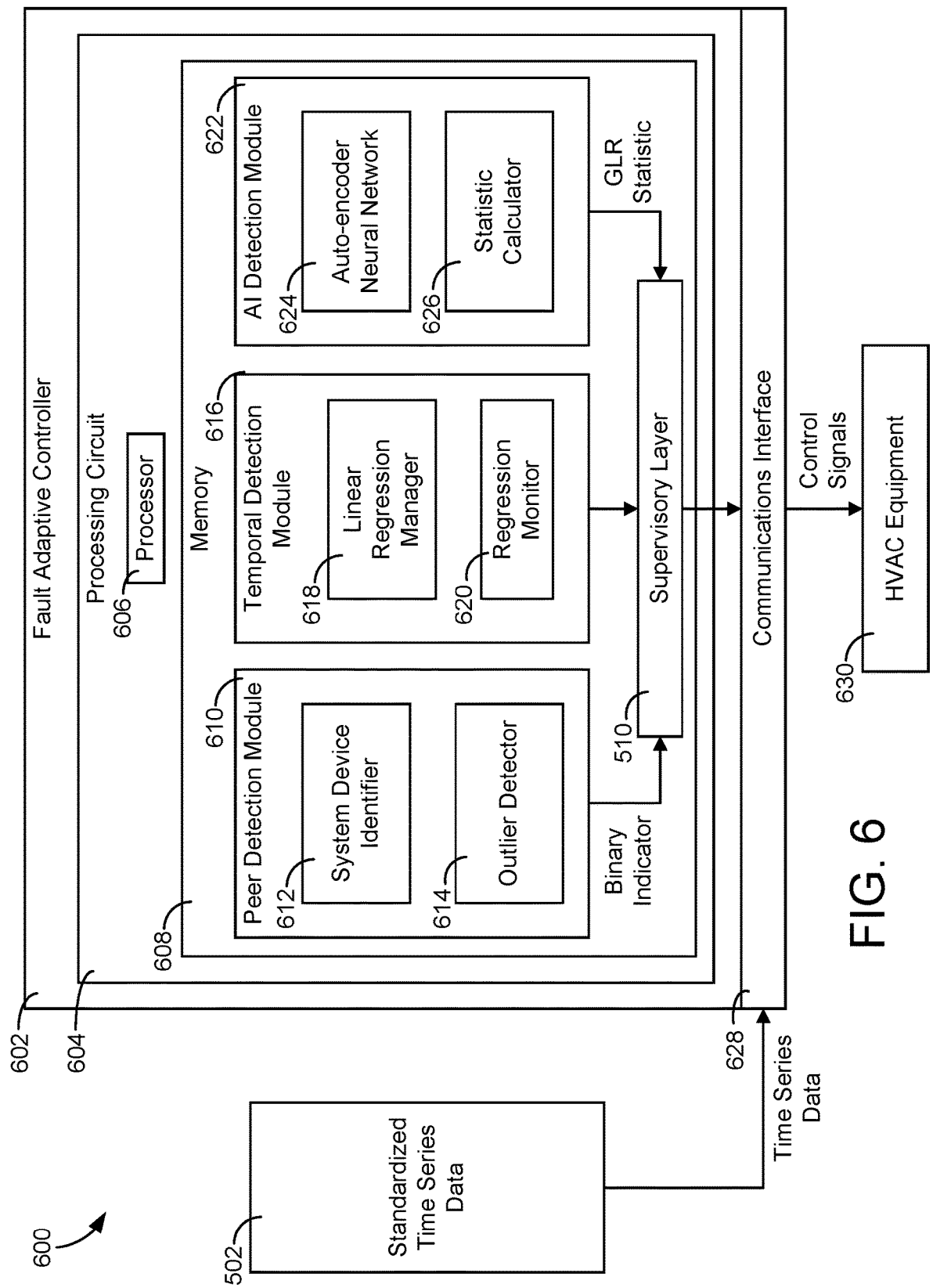
FIG. 6 is a block diagram of a controller for detecting faults in an HVAC system, which can be implemented in the HVAC system of FIG. 1, according to some embodiments.

Referring now to FIG. 6, system 600 for implementing control based on detected fault information is shown, according to exemplary embodiments. System 600 may be incorporated partially or entirely into the various other systems described herein, and vice versa. For example, system 600 may be incorporated into BMS system 400 to implement control of various HVAC equipment in central plant 200. In another example, system 600 is configured to implement the various methods and processes described above in system 500 with reference to FIG. 5. System 600 is shown to include fault adaptive controller 602, data 502, and HVAC equipment 630. Fault adaptive controller 602 is shown to include processing circuit 604 (including processor 606 and memory 608) and communications interface 628.

Communications interface 628 can facilitate communications between fault adaptive controller 602 and external applications/devices (e.g., data 502, HVAC equipment 630, BMS controller 366, etc.) for allowing user or automatic control, monitoring, and adjustment to fault controller 602. Communications interface 628 may facilitate communications between fault controller 602 and building subsystems 428 (e.g., HVAC, lighting security, lifts, power distribution, business, etc.) via HVAC equipment 630.

Communications interface 628 can be or include wired or wireless communications interfaces (e.g., jacks, antennas, transmitters, receivers, transceivers, wire terminals, etc.) for conducting data communications with HVAC equipment 630 or other external systems or devices. In various embodiments, communications via communications interface 628 can be direct (e.g., local wired or wireless communications) or via a communications network (e.g., a WAN, the Internet, a cellular network, etc.). For example, communications interface 628 can include an Ethernet card and port for sending and receiving data via an Ethernet-based communications link or network. In another example, communications interface 628 can include a Wi-Fi transceiver for communicating via a wireless communications network. In another example, communications interface 628 can include cellular or mobile phone communications transceivers. In one embodiment, communications interface 628 is a power line communications interface or Ethernet interface.

Processing circuit 604 can be communicably connected to communications interface 628 such that processing circuit 604 and the various components thereof can send and receive data via communications interface 628. Processor 606 can be a general purpose or specific purpose processor, an application specific integrated circuit (ASIC), one or more field programmable gate arrays (FPGAs), a group of processing components, or other suitable processing components. Processor 606 is configured to execute computer code or instructions stored in the memory or received from other computer readable media (e.g., CDROM, network storage, a remote server, etc.), according to some embodiments.

In some embodiments, memory 608 can include one or more devices (e.g., memory units, memory devices, storage devices, etc.) for storing data and/or computer code for completing and/or facilitating the various processes described in the present disclosure. Memory 608 can include random access memory (RAM), read-only memory (ROM), hard drive storage, temporary storage, non-volatile memory, flash memory, optical memory, or any other suitable memory for storing software objects and/or computer instructions. Memory 608 can include database components, object code components, script components, or any other type of information structure for supporting the various activities and information structures described in the present disclosure. Memory 608 can be communicably connected to processor 606 via processing circuitry 604 and can include computer code for executing (e.g., by processor 606) one or more processes described herein. Memory is shown to include peer detection module 610, temporal detection module 616, AI detection module 622, and supervisory layer 510.

Peer Detection

Peer detection module 610 may be configured to implement the processes described above with reference to peer detection method 504. In some embodiments, peer detection module 610, temporal detection module 616, and AI detection module 622 each perform peer detection method 504, temporal detection method 506, and AI detection method 508, respectively. Peer detection module 610 is shown to include system device identifier 612 and outlier detection 614.

In some embodiments, peer detection module 610 identifies various HVAC devices that are operating differently (e.g., outside of a predetermined threshold, outside of normal operation, malfunctioning, performing unreliably, etc.) than other HVAC devices. In some embodiments, peer detection module 610 identifies these HVAC devices operating differently as outliers. In some embodiments, peer detection module 616 will send a binary signal (e.g., binary 1) indicating an outlier/fault or the opposing binary signal (e.g., binary 0) indicating no outlier/no fault to supervisory layer 510 for each device. This may include not incorporating "off devices" (e.g., HVAC devices that are not operating or are not turned on) in the fault detection method. As such, off devices may not be considered outliers (e.g., not having a fault). In some embodiments, peer detection module 610 utilizes a zero-order hold when an HVAC device turns off to preserve the previous fault status when the device turns off.

In other embodiments, peer detection module 610 does not utilize a zero-order hold. By not using a zero-order hold, it can be difficult to determine when an HVAC device is operating incorrectly, as the HVAC devices may turn off and on very frequently, and any time an HVAC device turns off it is identified as not having a fault. This may result in a plot of data provided to supervisory layer 510 from peer detection module 610 resembling Gaussian noise (e.g., white Gaussian noise, etc.) as the HVAC devices continually "bounce" back and forth between having a fault when they are on, and not having a fault when they are off. Due to the noise-like data plot, this can make it difficult for supervisory layer 510 to draw significant and/or accurate meaning from the received data from peer detection module 610. However in some embodiments, noise-like data received from peer detection module 610 may not significantly affect analysis of the data at supervisory layer 510. Peer detection module 610 is shown to include system device identifier 612 and outlier detector 614.

System device identifier 612 may be configured to identify the various HVAC devices within system 600, system 100, central plant 200, airside system 300, waterside system 400, or any combination thereof. System device identifier 612 may utilize building information communication protocols (e.g., BACnet, MODBUS, etc.) to identify various devices connected to a network (e.g., via communications interface 628) to determine the type, location, purpose, functionality, and sensor data outputs of the device. System device identifier 612 may be configured to receive data relating to the various HVAC devices (e.g., temperature measurements, voltage levels, current levels, power levels, pressure measurements, toque measurements, positional measurements, etc.) and provide that information to outlier detector 614.

Outlier detector 614 may be configured to analyze the received operational data of the HVAC devices and determine which, if any, of the HVAC devices are acting as outliers. This may be performed by receiving data 502 over a period of time and generating a model of typical performance for an HVAC device and determining whether the received data 502 is within the typical performance indicated by the generated model.

Outlier detector 614 may be configured to receive outlier data points (e.g., data that is significantly outside the scope of normal operation) such as an error (e.g., 10,000 kelvin, −4° rotation, etc.) and to provide a binary signal to supervisory layer 510 indicating a fault in the HVAC system. Outlier detector may analyze the collected data 502 from system device identifier 612 and analyze it to determine if there are one or more faults. Outlier detector 614 may perform this by sending a fault signal (e.g., binary 1) to supervisory layer 510 in the event any information is considered to be an outlier (e.g., a single data point is outside of typical operation). In some embodiments, outlier detector 614 performs the analysis by providing a fault signal in the event that a significant percentage of the data is considered outlier data (e.g., 10%, 20%, 50%, etc.). These examples are merely intended to be exemplary, and outlier detector may determine the appropriate instances to send fault signals based on any of the above examples or variations thereof.

Temporal Detection: CUSUM and CUSUMSQ Algorithms

Temporal detection module 616 may be configured to calculate linear regression coefficients at each time step of data 502, monitor how those coefficients change over time, and provide a fault indication to supervisory layer 510 in the event that the coefficients significantly change to indicate a fault in the system. Temporal detection module 616 may incorporate cumulative sums (CUSUM) (e.g., running totals) that includes summation of a sequence of numbers which is updated each time a new number is added to the sequence, by adding the value of the new number to the previous running total. Temporal detection module 616 may also include cumulative sum of squares (CUSUMSQ). The CUSUM and CUSUMSQ algorithms are described in detail below.

The CUSUM and CUSUMSQ algorithms may assume a basic linear regression model of the form:

$$y_t = x_t \beta_t \text{ for } t=1, \ldots T \quad \text{(Eq. 1)}$$

where $y_t$ is the observation or output variable, $x_t$ are the covariables or input variables, $\beta_t$ are parameters, and t is time. Based on Eq. 1, $y_t$ can be estimated using the product $x_t \beta_t$. The $\beta$ parameters may be estimated using the least-squares estimate:

$$b_r = (X_r'X_r)^{-1} X_r' Y_r \quad \text{(Eq. 2)}$$

where the matrix $X_r'X_r$ is assumed to be non-singular (invertible). The first $b_r$ value is calculated on the first r observations, where r is the number of inputs, or, if the number of inputs does not yield an invertable $X_r'X_r$ matrix, then observations are added one by one until the matrix $X_r'X_r$ becomes non-singular. After the first $b_r$ value is calculated an initial sum of residual squares, $S_r$ is calculated:

$$S_r = (Y_r - X_r b_r)'(Y_r - X_r b_r) \quad \text{(Eq. 3)}$$

At each time step, r, several equations may be solved. The first equation is the recursive residual:

$$w_r = \frac{y_r - x_r' b_{r-1}}{\sqrt{1 + x_r'(X_{r-1}' X_{r-1})^{-1} x_r}} \quad \text{(Eq. 4)}$$

After calculating $w_r$ three more equations are solved. The first is a new value for matrix $(X_{r-1}'X_{r-1})^{-1}$:

$$(X_r' X_r)^{-1} = (X_{r-1}' X_{r-1})^{-1} - \frac{(X_{r-1}' X_{r-1})^{-1} x_r x_r' (X_{r-1}' X_{r-1})^{-1}}{1 + x_r'(X_{r-1}' X_{r-1})^{-1} x_r} \quad \text{(Eq. 5)}$$

In some embodiments, Eq. 5 is used to avoid directly calculating a matrix inverse at each time step. In some embodiments, only one matrix inverse is calculated at the beginning of the analysis (Eq. 2), and then new values of the inverse are calculated using the previous values, and no computationally expensive matrix inverse calculation is needed. Next, new coefficient values are calculated:

$$b_r = b_{r-1} + (X_r' X_r)^{-1} x_r (y_r - x_r' b_{r-1}) \quad \text{(Eq. 6)}$$

And a new residual sum of squares value is calculated:

$$S_r = S_{r-1} + w_r^2 \quad \text{(Eq. 7)}$$

In Eqs. 4-7, the r−1 subscripts indicate a value that was calculated during the previous time step, and the r subscripts indicate a value that was calculated during this time step.

In some embodiments, to perform the CUSUM test, another series of equations are used. The first is to calculate the CUSUM quantity array:

$$W_r = \frac{1}{\hat{\sigma}} \sum_{k+1}^{r} w_r \text{ for } r = k+1, \ldots, T \quad \text{(Eq. 8)}$$

Where k is the number of inputs, and T is the current total number of inputs that we have received. Those definitions for k and T also apply to the below equations. Note that $$W_r = \frac{1}{\hat{\sigma}} \sum_{k+1}^{r} w_r \quad \text{(Eq. 8)}$$

for r=k+1, . . . , T produces an array of values, because the sum is repeated T−(k+1) times, with a different number of values summed each time. After the CUSUM quantity array is calculated, the array is compared to two thresholds that bound the array. If any part of the array is outside the thresholds, then it indicates that the model coefficients have changed (the b values above), likely due to a fault. The equations for the thresholds are:

$$y = d + c(t-k) \text{ for } k \leq t \leq T \quad \text{(Eq. 9)}$$

and $$y = -d - c(t-k) \text{ for } k \leq t \leq T \quad \text{(Eq. 10)}$$

where:

$$d = a\sqrt{T-k} \text{ and } c = \frac{2a}{\sqrt{T-k}} \quad \text{(Eq. 11)}$$

In some embodiments, the a parameter comes from a table of values based on a confidence interval, $\alpha$:

| $\alpha$ | a |
|---|---|
| 0.01 | 1.143 |
| 0.05 | 0.948 |
| 0.10 | 0.850 |

In Eq. 8, the $\hat{\sigma}$ parameter represents the standard deviation, and is calculated by:

$$\hat{\sigma} = \sqrt{\frac{S_T}{T-k}} \quad \text{(Eq. 12)}$$

In some embodiments, Eq. 12 must be recalculated each time step. In some embodiments, Eq. 12 underestimates the standard deviation of the data, resulting in CUSUM testing triggering many false positives. Therefore, in some embodiments, standard deviation may be calculated using predetermined functions (e.g., std( ) in MATLAB, etc.). The value for $S_T$ is calculated as a part of the CUSUMSQ test. It is defined as:

$$S_T = \Sigma_{j=k+1}^{T} w_j^2 \quad \text{(Eq. 13)}$$

Where the values for $w_j^2$ come from Eq. 4. The full CUSUMSQ test calculation is defined as:

$$s_r = (\Sigma_{j=k+1}^{r} w_j^2)/S_T \text{ for } r=k+1, \ldots, T \quad \text{(Eq. 14)}$$

In some embodiments, Eq. 14 will produce an array of values (because it must be calculated for different values of r), where the final value is always equal to 1. To determine if there is a fault, the CUSUMSQ array may be compared to a pair of thresholds defined as:

$$y = \pm c_0 + (r-k)/(T-k) \text{ for } r=k+1, \ldots, T \quad \text{(Eq. 15)}$$

The value of $c_0$ is defined as:

$$c_0 = \frac{a_{1a}}{n^{1/2}} + \frac{a_{2a}}{n} + \frac{a_{3a}}{n^{3/2}} \quad \text{(Eq. 16)}$$

Where n is the number of samples, and the parameters $a_{1a}$, $a_{2a}$, and $a_{3a}$ are based on a confidence interval, $\alpha$, and are defined in the table below:

| $\alpha$ | $a_{1\alpha}$ | $a_{2\alpha}$ | $a_{3\alpha}$ |
|---|---|---|---|
| 0.01 | 1.5174271 | −0.6702672 | −1.0847745 |
| 0.05 | 1.2238734 | −0.6700069 | −0.7351697 |
| 0.10 | 1.0729820 | −0.6698868 | −0.5816458 |

In some embodiments, the three parameters are calculated using recursive least squares, as it this allows for the calculations to be used for any number of samples, and can therefore be calculated dynamically at run time in a program. Conversely, looking a value up in a table is limiting in terms of the sample sizes allowed. If any part of the CUSUMSQ array defined in Eq. 14 is outside of the thresholds defined in Eq. 15, it may indicate that the coefficients of the linear regression have changed (e.g., the b values in Eq. 6), which can be due to a fault.

Temporal Detection: CUSUM and CUSUMSQ Implementation

In some embodiments, the CUSUM and CUSUMSQ fault detection methods are implemented as a MATLAB class, with the same functions as a GLR detector class; however, the functions may have different input and output parameters. In some embodiments, the constructor has, as inputs, the confidence interval (e.g., the a value as described in the two tables above), how much historical data to store and keep track of, the number of inputs, the model type, and the output data standard deviation. The class may add one input to the total number of inputs to support an intercept term when deriving the linear regression model. In some embodiments, the model type can be a value of "linear" or "quadratic". The "quadratic" model type uses linear terms, squared terms, the products of each of the inputs, and the intercept term to artificially inflate the number of inputs to ideally create a more accurate model. When generating the final set of data (as described below with reference to FIGS. 14-21), the linear model was used as it produced better results than the quadratic model.

In some embodiments, the addData( ) function is used to add a new set of measurements to the detector. The detectFault( ) function is used to detect a fault. It must be called after all of the internal data structures in the object have been filled. This function returns a variety of data to identify the status of the fault and the detector. In some embodiments, only the cusumFaultSum and cusumsqFaultSum output values are sent to the Supervisory Layer. The ready( ) function may return a 1 when the detector is ready to start detecting faults. In some embodiments, it is ready to detect faults after all of its internal data structures have been populated.

In some embodiments, when using the CUSUMDetector4 class, the addData( ) function is called to add data to the detector object every time step, but only when the device the detector object represents is currently running (the current is non-zero). If the current is zero, then it is assumed that the HVAC device (e.g., compressor) is off and no new data is added to the detector for that time step. The detect( ) function is called every time step, including when the device is off, after the ready( ) function indicates that it is safe to start detection. In some embodiments, calling detect( ) when no new data was added to the detector, because the device was off, effectively results in a zero-order hold of the last data output by the detect( ) function until the device is turned back on.

In some embodiments, the CUSUM detector uses an equation for the standard deviation that requires it to be recalculated at each time step. The below table compares values for the standard deviation calculated using Eq. 12, standard deviation functionality (e.g., MATLAB's std( ) function, etc.):

| Situation | CUSUM | MATLAB |
|---|---|---|
| Point 1 | 0.2192 | 0.6527 |
| Point 2 | 0.17673 | 0.4161 |
| Point 3 | 0.18144 | 0.4181 |

The CUSUM equation is underestimating the standard deviation by a factor in the range of 2 to 3. By changing to a fixed standard deviation value using MATLAB's std( ) function instead of recalculating the standard deviation using the CUSUM standard deviation equation, the amount of false positives the CUSUM detector generates can be reduced. This is proved by comparing the number of false positives created using both methods.

Figure 7:
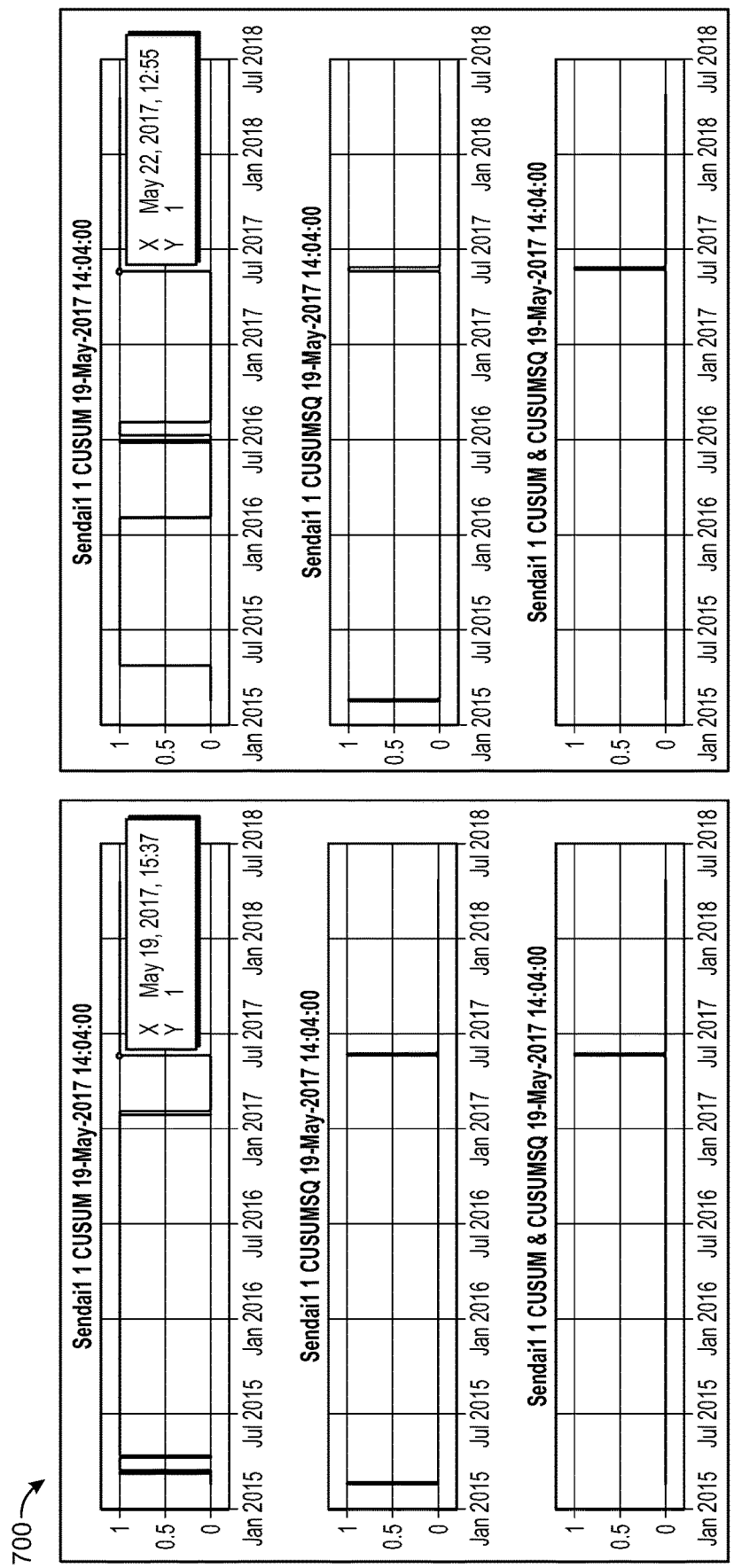
FIG. 7 is a diagram of data plots from analyzing time series data to detect faults, which can be implemented by the controller of FIG. 6, according to some embodiments.
Figure 8:
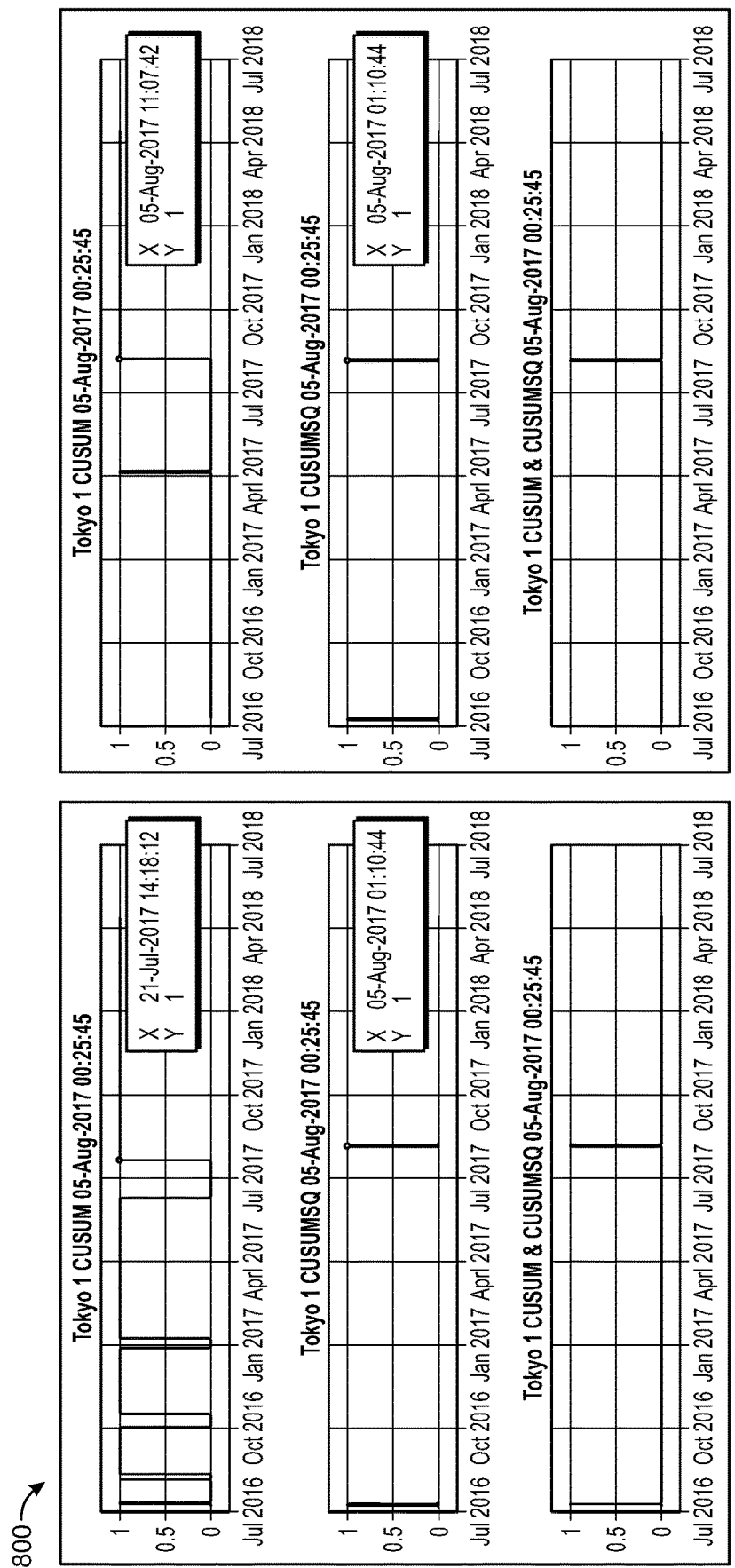
FIG. 8 is a diagram of data plots from analyzing time series data to detect faults, which can be implemented by the controller of FIG. 6, according to some embodiments.

Referring now to FIGS. 7-8, various comparisons between CUSUM standard deviation and MATLAB standard deviation are shown, according to some embodiments. FIG. 7 shows diagram 700 comparing CUSUM standard deviation calculation (left) and MATLAB standard deviation (right). Diagram 700 shows the MATLAB standard deviation with significantly fewer false positives. FIG. 8 shows diagram 800 showing CUSUM standard deviation (left) and MATLAB standard deviation (right). Similar to FIG. 7, the MATLAB standard deviation is shown to have fewer false positives than the standard deviation calculation.

AI Detection

Referring back to FIG. 6, AI detection module 622 may be configured to use an auto-encoder neural network (NN) (e.g., auto-encoder neural network 624) as a control model to calculate an output of the system. In some embodiments, output of auto-encoder neural network 624 and the measured output are provided to statistic calculator 626. Statistic calculator 626 may then produce a single number (e.g., a GLR statistic, etc.) which is provided to supervisory layer 510 and used to determine if there is a fault.

In some embodiments, other types of signals can be provided to supervisory layer 510 and do not need to be binary signals (e.g., a 0 or a 1) indicative of a fault or no fault. In some embodiments, the signals provided to supervisory layer 510 can include other intermediate data from the fault detection models. In some embodiments, the signal provided to supervisory layer 510 can include a probability of a fault (e.g., 75% chance of a fault), rather than a binary indication of a fault or no fault.

Auto-encoder neural network 624 may be configured to use a neural network to generate an auto-encoder for the purposes of determining fault conditions in a system. Auto-encoder neural network 624 may be a type of neural network that tries to reproduce its input as its output. When used for fault detection, the auto-encoder may be trained on only good data. For example, when a fault happens and the input data is changed due to the fault, the auto-encoder will not be able to duplicate the new faulty data and will instead reproduce only the equivalent good data, because all the NN "knows" is how to produce good data. In other embodiments, both bad data (e.g., erroneous data intentionally provided to the NN for training purposes) and good data are provided to the NN. In other embodiments, when training the NN, both erroneous data and data without errors can be provided in substantially balanced amounts to ensure the NN is not biased one way or the other.

Some or all training data provided to the neural network can be or include data from an instant in time, and does not necessarily need to be or include timeseries data. Auto-encoder neural network can be or include any type of neural network, include long short-term memory, a recursive neural network, a WindowResidualDetector detector class of MAT-LAB, and a convolutional neural network. In some embodiments, the multiple fault detection results are provided for the same instant in time and/or are provided as a timeseries of results from each model. A combination of real-time fault detection results and timeseries results can be provided for some or all of the models.

In some embodiments, the difference between the output of the NN and the measured output is used to calculate a residual. A residual value is the difference between a measured value and expected value, and can be represented by the following equation: $r=y-\hat{y}$, where y is the measured data, and $\hat{y}$ is the data calculated from the model. In some embodiments, the residual is provided to statistical calculator 626 and implemented in the following equation:

$$g_k = \frac{1}{2\sigma^2} \max_{1 \le j \le k} \left( \frac{1}{k-j+1} \left[ \sum_{i=j}^{k} r[i] \right]^2 \right) \quad \text{(Eq. 17)}$$

to calculate the GLR statistic, $g_k$, at every time step. Then, $g_k$ is sent to supervisory layer 510 for final fault determination. An exemplary system incorporating auto-encoder neural network 624 is shown in FIG. 9.

Figure 9:
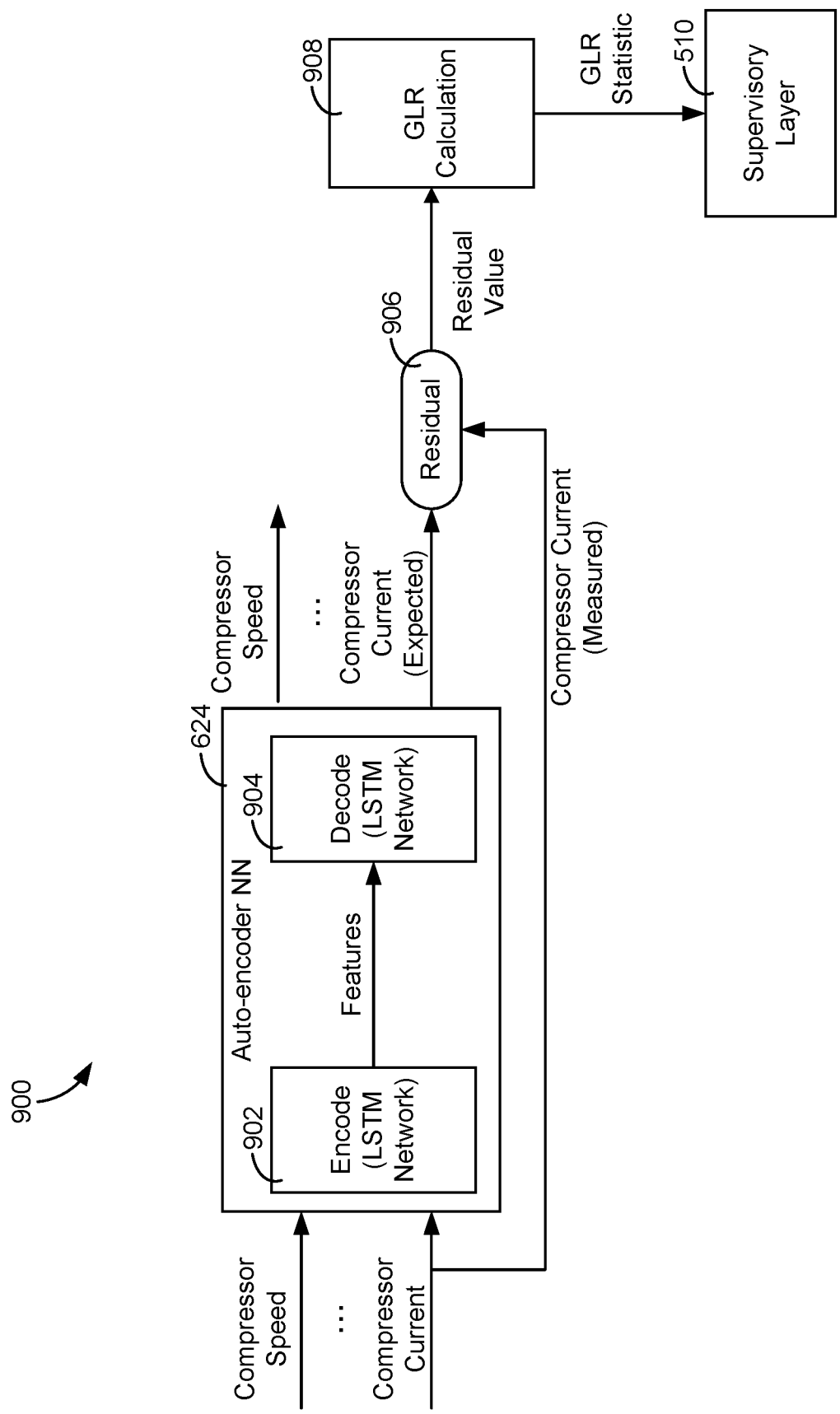
FIG. 9 is a block diagram of a system that uses a neural network to detect faults, which can be implemented in the system of FIG. 5, according to some embodiments.

Referring now to FIG. 9, a diagram 900 for providing fault information based on decisions made by auto-encoder neural network 624 is shown, according to exemplary embodiments. The system described in diagram 900 may be incorporated partially or entirely in the various systems described herein, and vice versa. For example, the system described in diagram 900 may be incorporated into system 600. Diagram 900 is shown to include auto-encoder neural network 624 including encode module 902, decode module 904, residual module 906, and GLR calculation module 908. Diagram 900 may describe systems and/or process that can be implemented by fault adaptive controller 602.

Auto-encoder neural network 624 receives various pieces of data. This data may be substantially similar or identical to data provided by data 502 (e.g., compressor speed, $P_s$, $P_d$, $T_d$, compressor current, etc.). Auto-encoder neural network 624 attempts to reproduce an output that matches the received input. For example, auto-encoder neural network 624 receives five pieces of data from data 502: compressor speed, $P_s$, $P_d$, $T_d$, and compressor current. While auto-encoder neural network 624 reproduces all 5 pieces of data, only the compressor current is considered for fault detection. The measured compressor current data is provided to residual 906, along with the expected compressor current data, to determine the residual value. The residual value is provided to GLR calculation module 908 to determine a GLR statistic, which is provided to supervisory layer 510 and is indicative of fault detection. An example of the type of data that is produced by auto-encoder neural network 624 after a fault is injected is shown in FIG. 10.

In some embodiments, the systems and methods described in diagram 900 outline one of several methods for determining faults in an HVAC system. Particularly, diagram 900 utilizes analyzing a difference between expected and measured measurements (e.g., a residual), and making inferences on faults (e.g., stuck valve, malfunctioning compressor, low pump speed, etc.) based on the residual. This information may be provided to a supervisory layer of a building controller (e.g., supervisory layer 2012) to determine whether corrective action needs to be taken based on the detected fault information (e.g., the GLR statistic).

It should be understood that any change that impacts system dynamics of an HVAC system or building space falls within the scope of a fault in the HVAC system, even if such a change is not associated with faulty equipment. Events commonly categorized as disturbances to the system (e.g., increased heat transfer into or out of a space as a result of leaving a window or door open, increased sunlight, etc.) or changes to the physical or thermodynamic properties of the space (e.g., new objects in the space that impact thermal energy storage/capacitance within the space, removal or addition of a temporary wall or partition in the space, etc.) fall within the scope of "faults" as described herein. Additionally, any type of equipment malfunction within any system described herein can constitute a fault, and is not limited to faults occurring within the BMS layer (e.g., within BMS 400, etc.).

Figure 10:
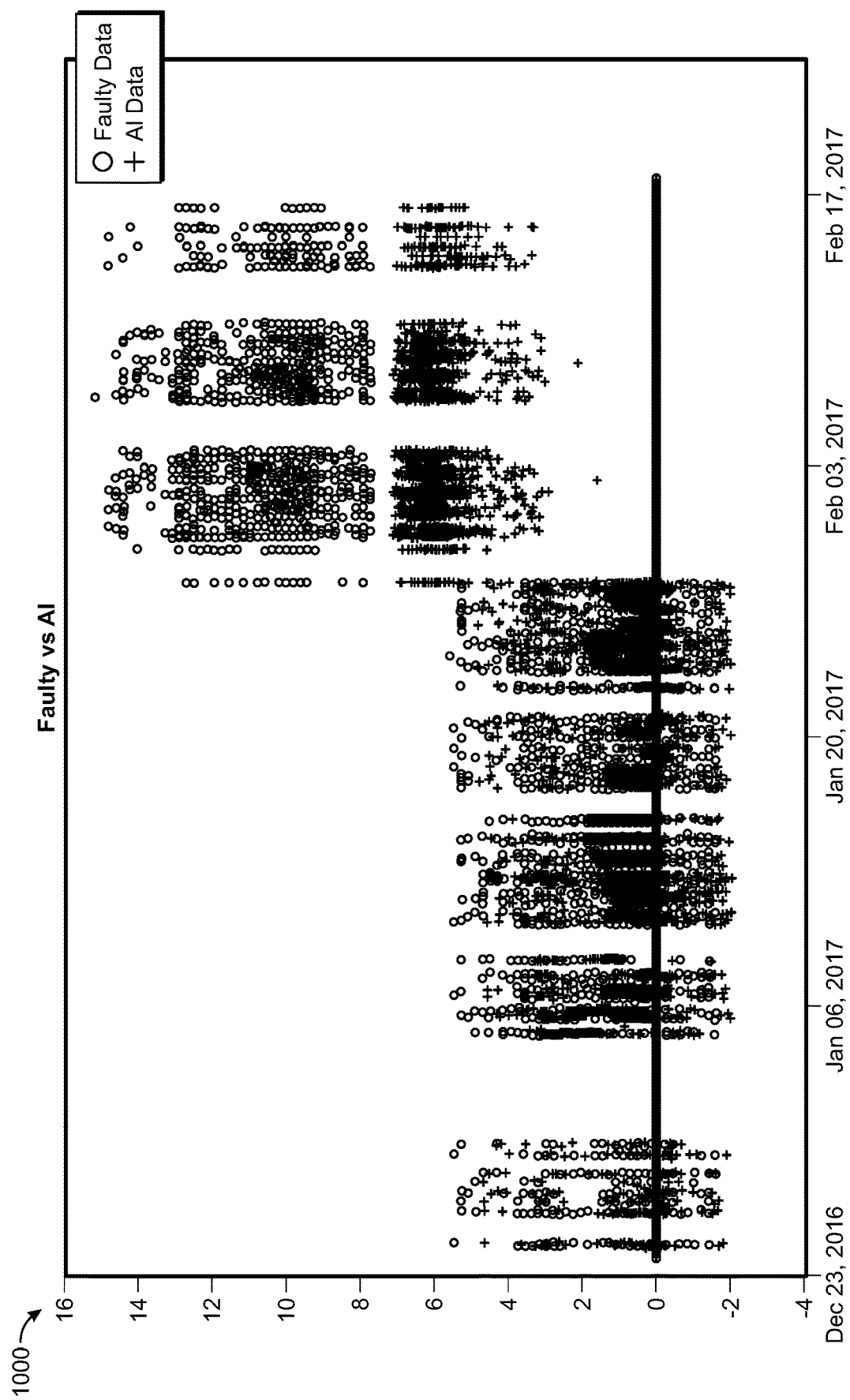
FIG. 10 is a diagram of a data plot shown time series data in a fault detection system, which can be generated by the controller of FIG. 6, according to some embodiments.
Figure 12:
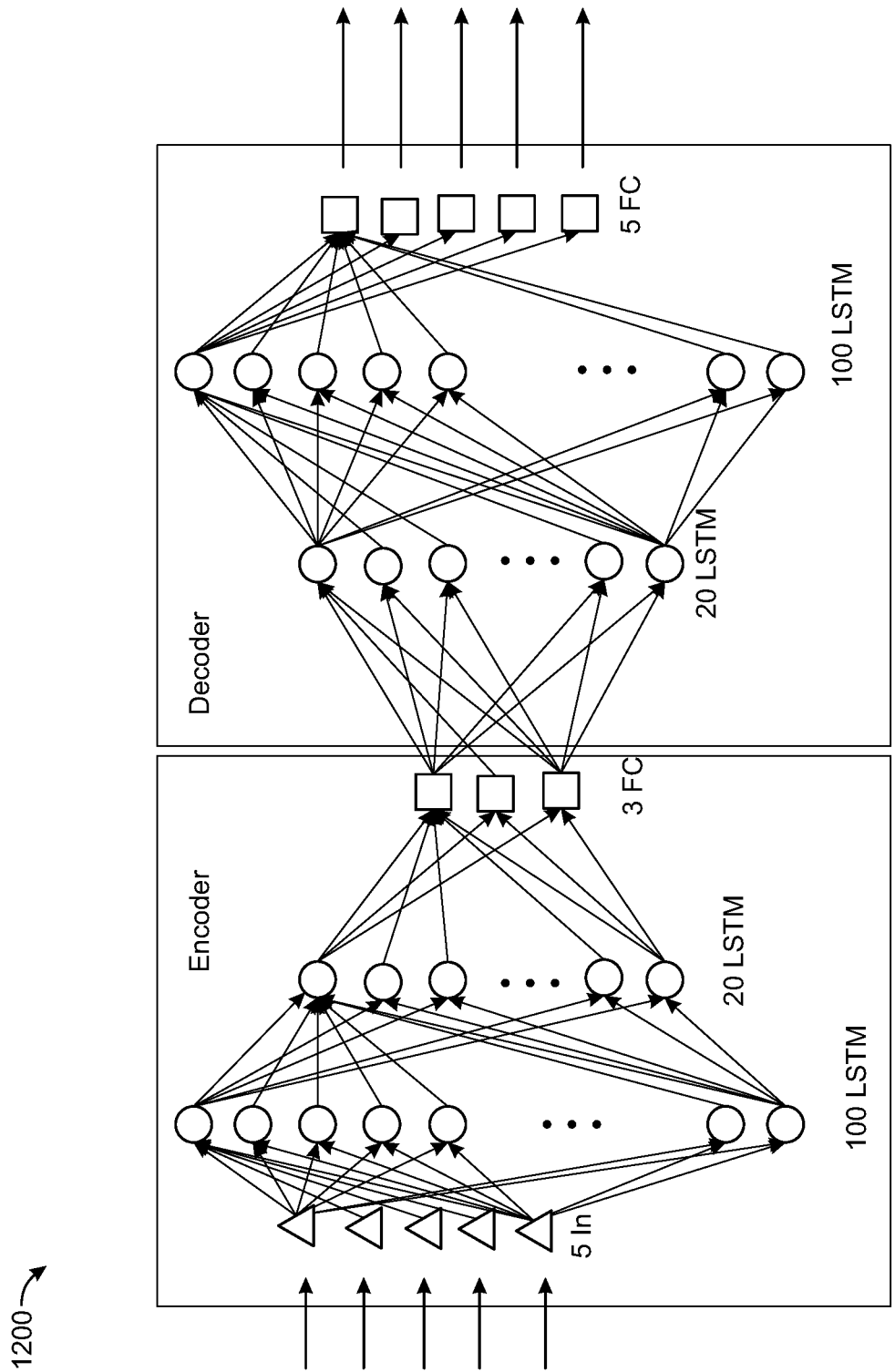
FIG. 12 is a diagram of a neural network for detecting faults, which can be generated by the controller of FIG. 6, according to some embodiments.

Referring now to FIG. 10, a diagram 1000 for comparing the difference between measured data received by auto-encoder neural network 624 from data 502 and estimated data. In some embodiments, the blue circles are the measured data and the red pluses are data estimated by auto-encoder neural network 624. Diagram 1000 shows auto-encoder neural network 624 produces data such that there is a measurable difference between the measured data and the estimated data. In some embodiments, this difference between the measured data and estimated data (e.g., the residual) is utilized for determining a fault condition. In some embodiments, the type of NN used by auto-encoder neural network 624 is a LSTM network. An LSTM network may be used as it is better able to replicate time series data than a CNN. Code for generating auto-encoder neural network 624 is shown in FIG. 11. Additionally, a diagram of auto-encoder neural network 624 is shown in FIG. 12.

Referring now to FIG. 11, a diagram 1100 showing a snippet of code for generating at least a portion of auto-encoder neural network 624 is shown, according to some embodiments. Referring now to FIG. 12, a diagram 1200 showing the inputs (left), outputs (right), and hidden layers of auto-encoder neural network 624. Diagram 1200 shows two distinct sections of auto-encoder neural network 624: the encoder portion (left), responsible for encoding data 502 and the decoder portion (right) responsible for decoding data 502.

Supervisory Layer

Referring back to FIG. 6, supervisory layer 510 may be configured to receive the various fault detection information (e.g., binary indicator, GLR statistic, etc.) and make control decisions based on the received fault detection information. Supervisory layer 510 may also include neural network functionality. In some embodiments, supervisory layer 510 may use the detection fault information (i.e., data from peer detection module 610, temporal detection module 616, and AI detection module 622) as training data.

In some embodiments, the detected fault information provides conflicting indications of fault detection, and at least some level of inference is required by supervisory layer 510 is required to make a fault determination. For example, as peer detection module 610 can only provide an indication of a fault (e.g., binary 1) or a non-fault (e.g., binary 0), peer detection module 610 is incapable of providing a potential of a fault and therefore provides a binary indication of a fault. However, AI detection module 622, after analyzing the residual of data 502, determines that, while there is a discrepancy between the measured data and the expected data, the residual is not great enough to be indicative of a fault in the system. Accordingly, AI detection module 622 provides a GLR statistic that indicates that there is not a fault detected by AI detection module 622. Supervisory layer 510 may then need to make a determination as to whether there is an existing fault based on the conflicting inputs. This determination may be based on inferences and/or predictions (e.g., models, trends, forecasting, etc.) from previously received fault detection information.

Various types of neural networks may be considered for neural networking functionality in supervisory layer 510, including a classifying LSTM network that classifies fault or no fault based on the outputs of the three detectors (e.g., as described above) and neural networks that identifies clusters. Additionally, supervisory layer 510 may maintain a history of the outputs of the three detectors. In some embodiments, supervisory layer 510 replaces "old data" with "new data" at each time step, and performs a cluster analysis on the data. Old data may refer to data that has past the time period in which time series data is being held in storage within fault adaptive controller 602, while new data refers to the incoming time series data. In some embodiments, storage within fault adaptive controller 602 has storage limitations that requires data to be dumped (e.g., forgotten) after a period of time (e.g., 1 hours, 1 day, 1 year, etc.).

As mentioned above, supervisory layer 510 may include functionality for identifying clusters. In some embodiments, if there is more than one cluster, or a cluster much farther away from the others, can indicate a fault. Independent of the type Supervisory Layer NN is the data the detectors send to the Supervisory Layer NN. The type of data each detector sends is in the below table:

| AI + GLR | GLR Statistic (positive floating point number) |
|---|---|
| Temporal | Count of values outside of thresholds (two positives integers) |
| Peer | Outlier (1)/Not outlier (0) (binary) |

Figure 13:
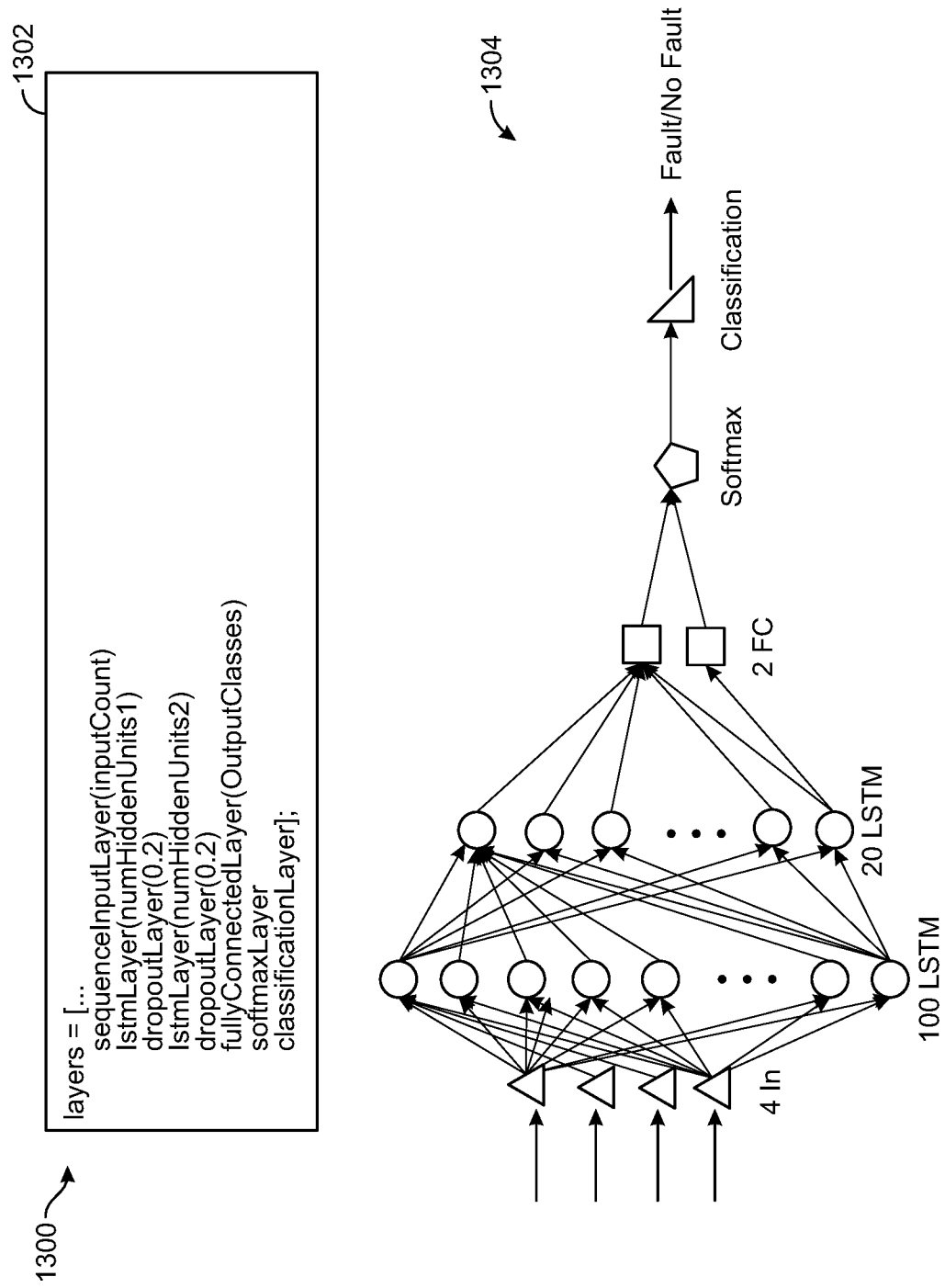
FIG. 13 is a diagram is portion of code for generating at least a portion of a neural network and a diagram of a neural network for detecting faults which can be generated by the controller of FIG. 6, according to some embodiments.

In some embodiments, the LSTM classifier neural network takes in the data from the three detectors (e.g., AI+GLR, Temporal (CUSUM & CUSUMSQ), and Peer), analyzes the data as time series data, and estimates if there is a fault at each time step. In some embodiments, it does not try to identify the source or type of the fault, only if there is a fault. In some embodiments, the LSTM Classifier NN encode module 902 in functionality. FIG. 13 shows a snippet of code and a diagram of While auto-encoder neural network 624 as a LSTM neural network.

Referring now to FIG. 13, diagram 1300 including code 1302 and NN diagram 1304 is shown, according to exemplary embodiments. In some embodiments, supervisory layer 510 uses two separate neural network LSTM layers. The fully connected layer may have two elements because there are two output values for the network. In some embodiments, the final softmax and classification layers are required by MATLAB for a classification network. Code 1302 includes two dropout layers that are not shown in diagram 1304. In some embodiments, the dropout layers are only active during training and randomly set a specified percentage of their inputs to zero. In some embodiments, the goal of the dropout layers is to prevent the NN from overfitting the input data. Auto-encoder neural network 624 can be trained on multiple sets of data (e.g., hundreds or even thousands of sets, etc.).

In some embodiments, auto-encoder neural network 624 is implemented with cluster identification functionality. In some embodiments, a multi-paradigm numerical computing environment and programming language (e.g., MATLAB) is used to implement clustering functionality. In some embodiments, the clusters of data of identified during training and, in some embodiments, there really is no stage where the trained network is "used". It does appear possible to count the number of clusters the data produces in code (most examples in the MATLAB help only produce a visual display of the clusters), which is critical for this method. In some embodiments, training auto-encoder neural network 624 to identify the clusters can take a longer period of time (e.g., 10 seconds, 14-15 seconds, 30 seconds, etc.) to cluster a signification amount of data points (e.g., 500 data points). As such, implementing this method in auto-encoder neural network 624 with a 500 data point window to identify faults can take more than two months (approximately 66 days) to complete one set of data with the time ranges described above. In some embodiments, this is an unsupervised method and does not require curated training data, as the curated training data is easy to generate similar to the LSTM classifier functionality. Additionally, various clustering algorithms may be found in multi-paradigm numerical computing environment and programming languages (e.g., within the toolbox of the application for the programming language, etc.).

In some embodiments, supervisory layer 510 can be configured to analyze raw data being received directly from data 502, or "intermediate" data that acts as a layer in between raw data and determining a fault indication. For example, intermediate data may include statistical probabilities, averages, deviations from a typical operating threshold, etc. In some embodiments, supervisory layer 510 processes binary "fault or no fault" results. In some embodiments, supervisory layer 510 processes any type of data or metric that is generated using any of the different fault detection methods, even if this does not explicitly indicate fault or no fault.

Auto-Encoder Implementations

Referring now to FIGS. 14-21, various results of implementing fault detection methods (e.g., peer detection method 504, temporal detection 506, AI detection 508, etc.) within an HVAC system is shown, according to exemplary embodiments.

Figure 14:
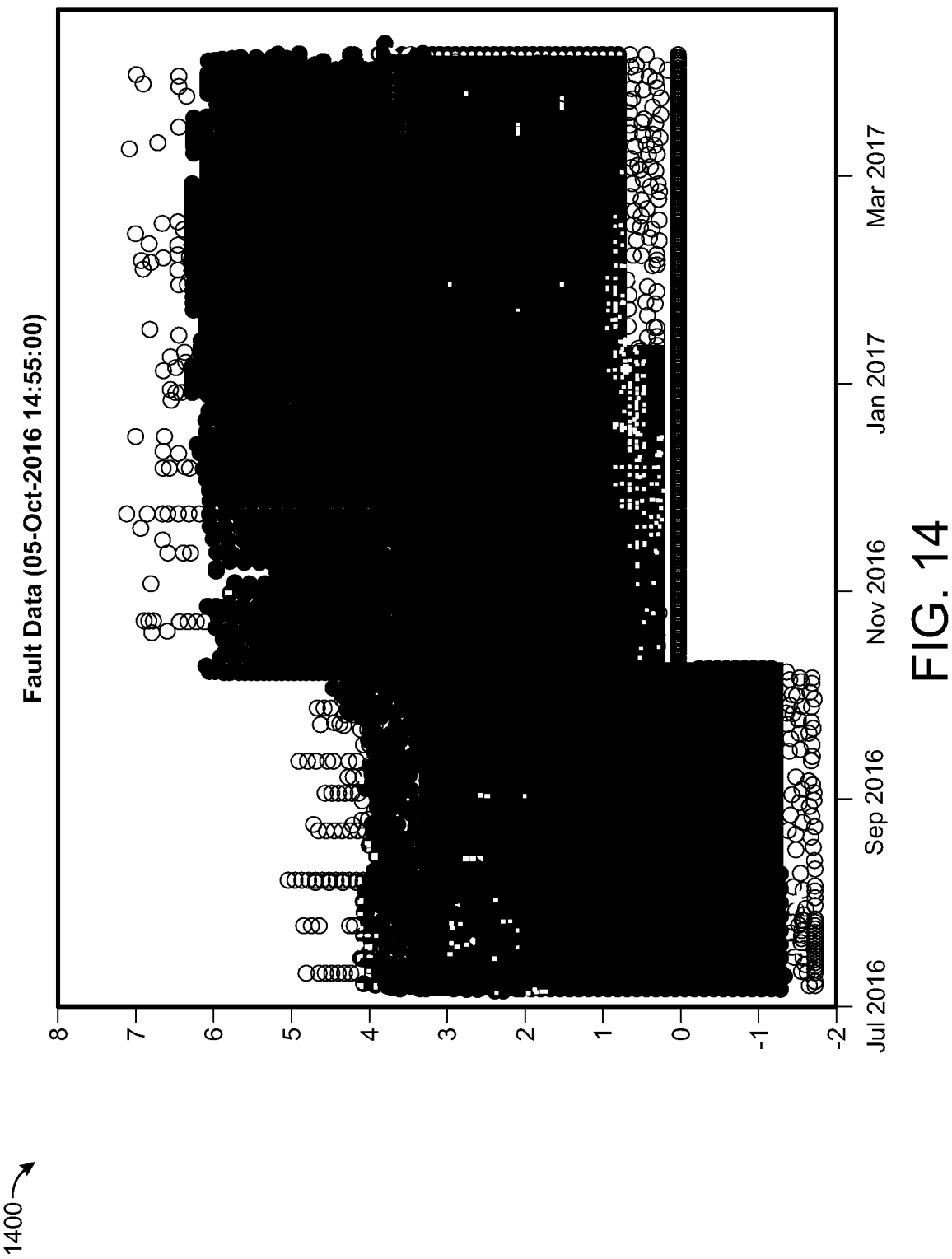
FIG. 14 is a diagram of a data plot shown time series data in a fault detection system, which can be generated by the controller of FIG. 6, according to some embodiments.
Figure 15:
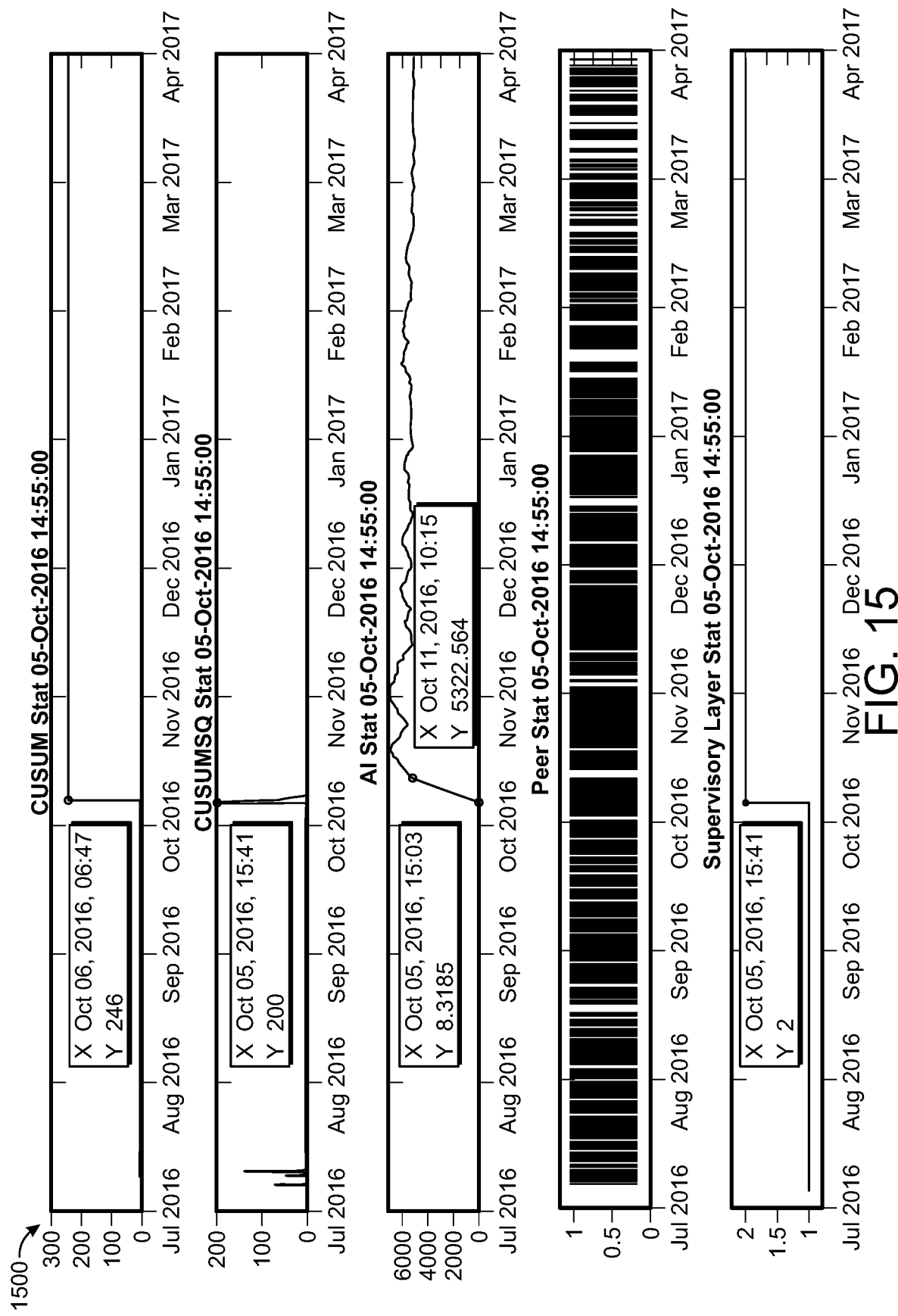
FIG. 15 is a diagram of data plots from analyzing time series data to detect faults, which can be implemented by the controller of FIG. 6, according to some embodiments.

Referring now to FIG. 14, a diagram 1400 showing an abrupt fault injected into otherwise typical operational data at about 35% of the data is shown, according to exemplary embodiments. Processing within fault adaptive controller 902 is shown correcting the fault. FIG. 15 shows diagram 1500 for detecting data for various parts of the supervisory layer 510. Supervisory layer 510 is able to identify and flag the fault, which can be seen in the bottom portion of diagram 1400.

In some embodiments, supervisory layer 510 is configured to only detect faults and analyze inputs of fault detections to make supervisory fault detection decisions, and is not configured to make control decisions after detecting the faults. In other embodiments, supervisory layer may both detect faults in any of the ways described herein any make control decisions based on the detected faults.

Figure 16:
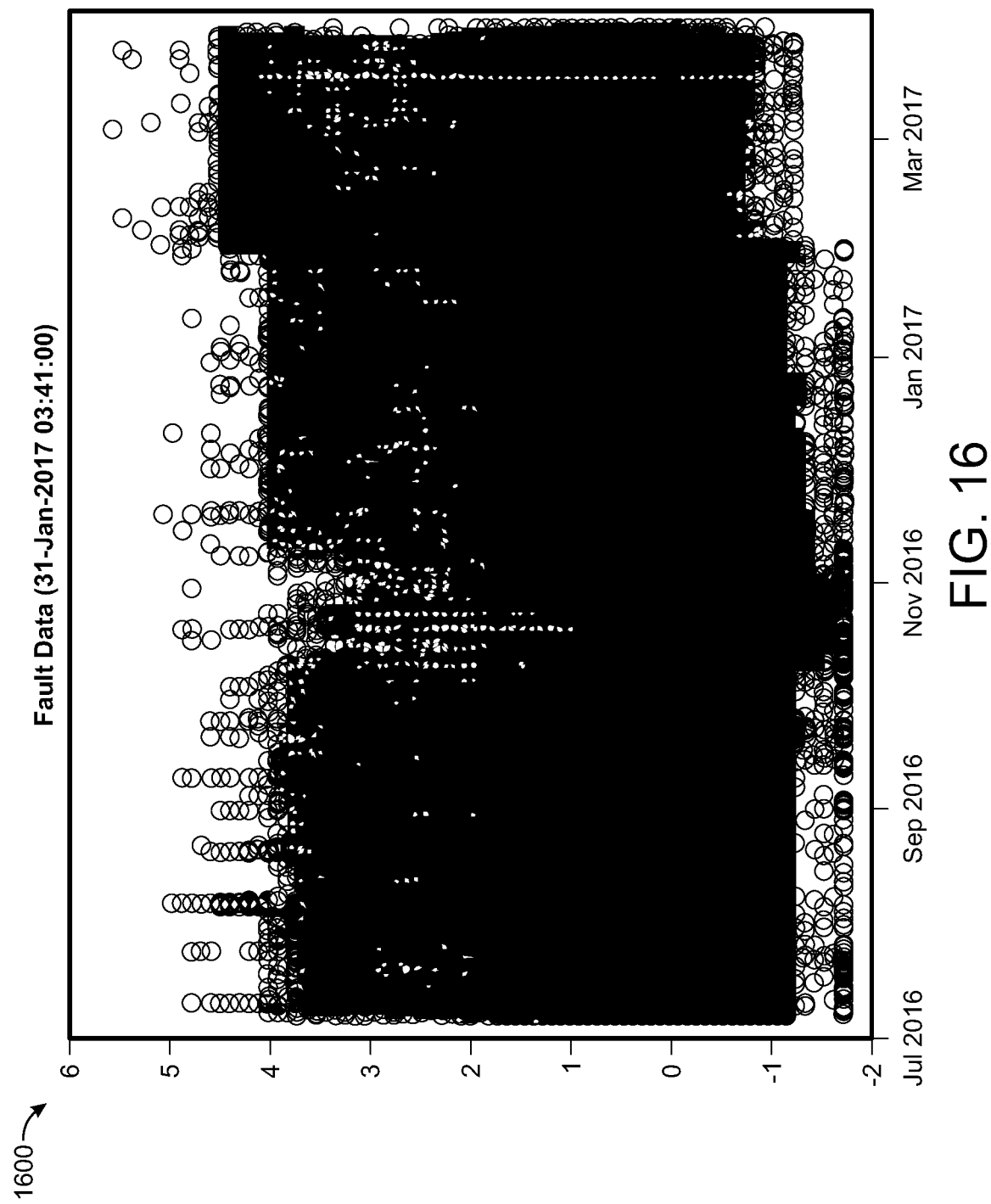
FIG. 16 is a diagram of a data plot shown time series data in a fault detection system, which can be generated by the controller of FIG. 6, according to some embodiments.
Figure 17:
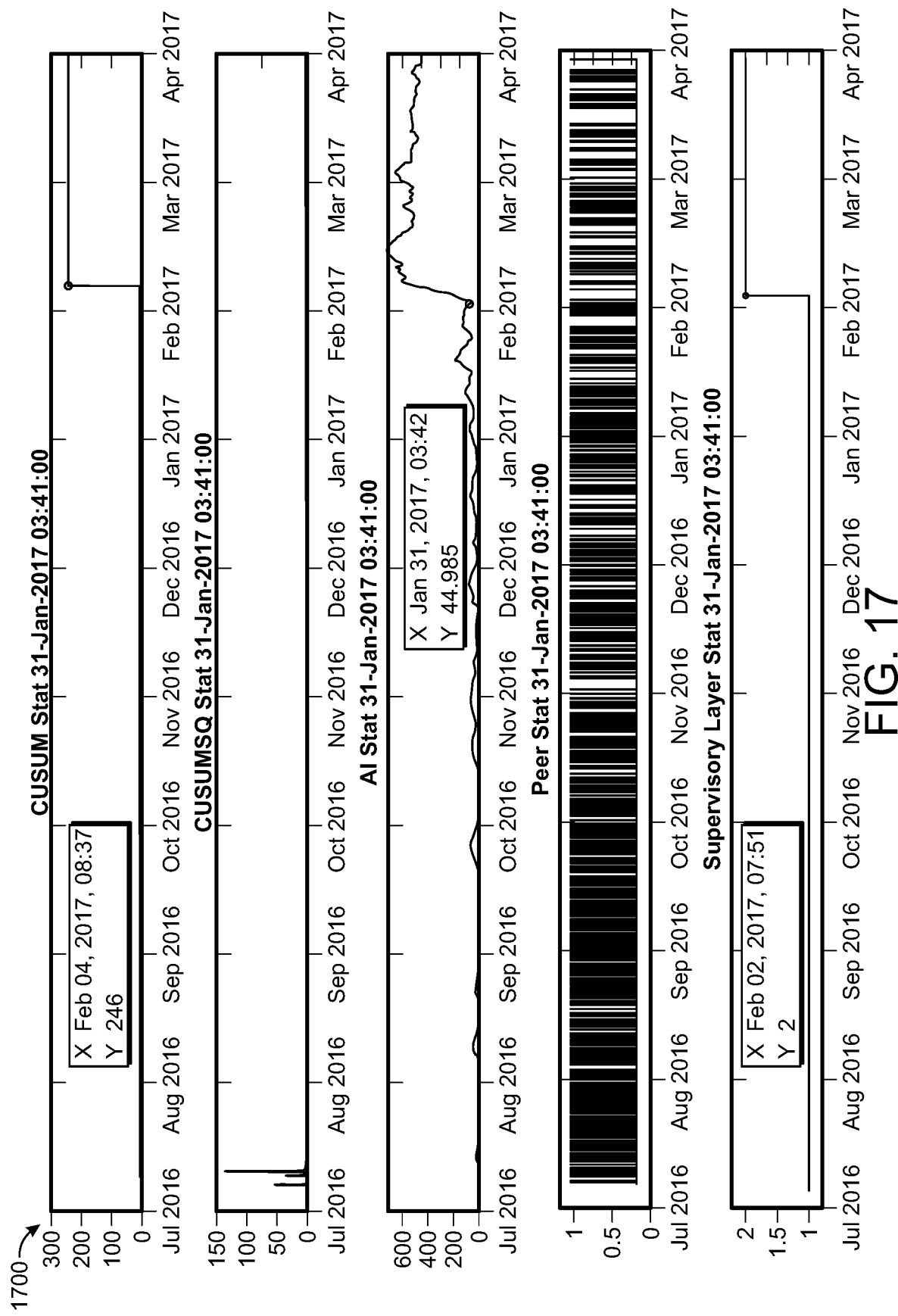
FIG. 17 is a diagram of data plots from analyzing time series data to detect faults, which can be implemented by the controller of FIG. 6, according to some embodiments.

Referring now to FIG. 16, a diagram 1600 showing an abrupt fault injected into otherwise typical operational data at about 80% of the data is shown, according to exemplary embodiments. FIG. 17 showing diagram 1700 shows various layers of supervisory layer 510. Diagram 1700 shows supervisory layer 510 not detecting the fault as quickly as shown in diagram 1500, and the that CUSUMSQ functionality (second from top) does not identify the fault at all. Diagram 1700 shows supervisory layer 510 detecting the fault before either CUSUM or CUSUMSQ functionalities detected the fault (e.g., CUSUMSQ did not detect the fault at all) This indicates that the neural network of supervisory layer 510 is using all of the information it is given to determine if there is a fault.

Figure 18:
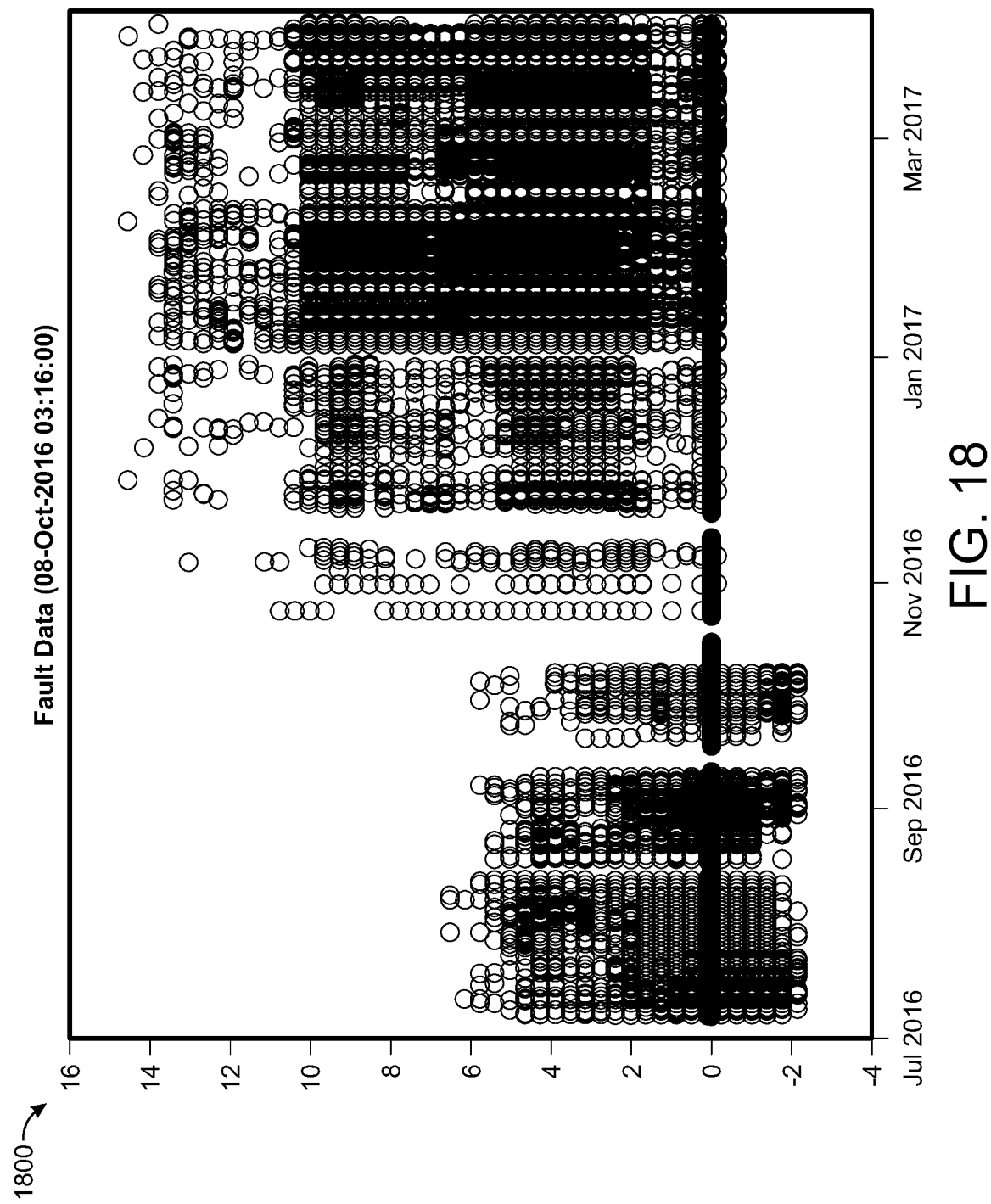
FIG. 18 is a diagram of a data plot shown time series data in a fault detection system, which can be generated by the controller of FIG. 6, according to some embodiments.
Figure 19:
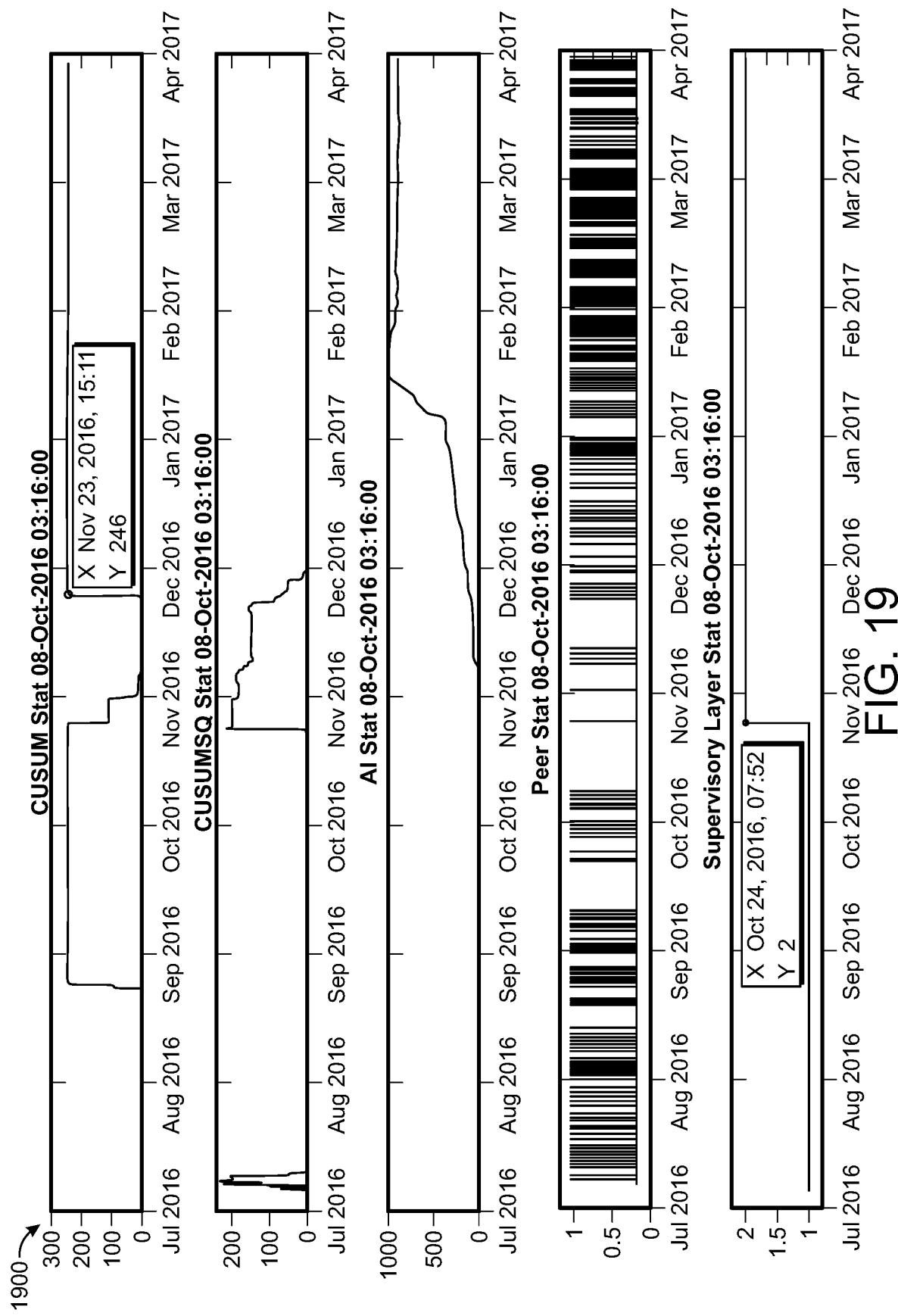
FIG. 19 is a diagram of data plots from analyzing time series data to detect faults, which can be implemented by the controller of FIG. 6, according to some embodiments.
Figure 20:
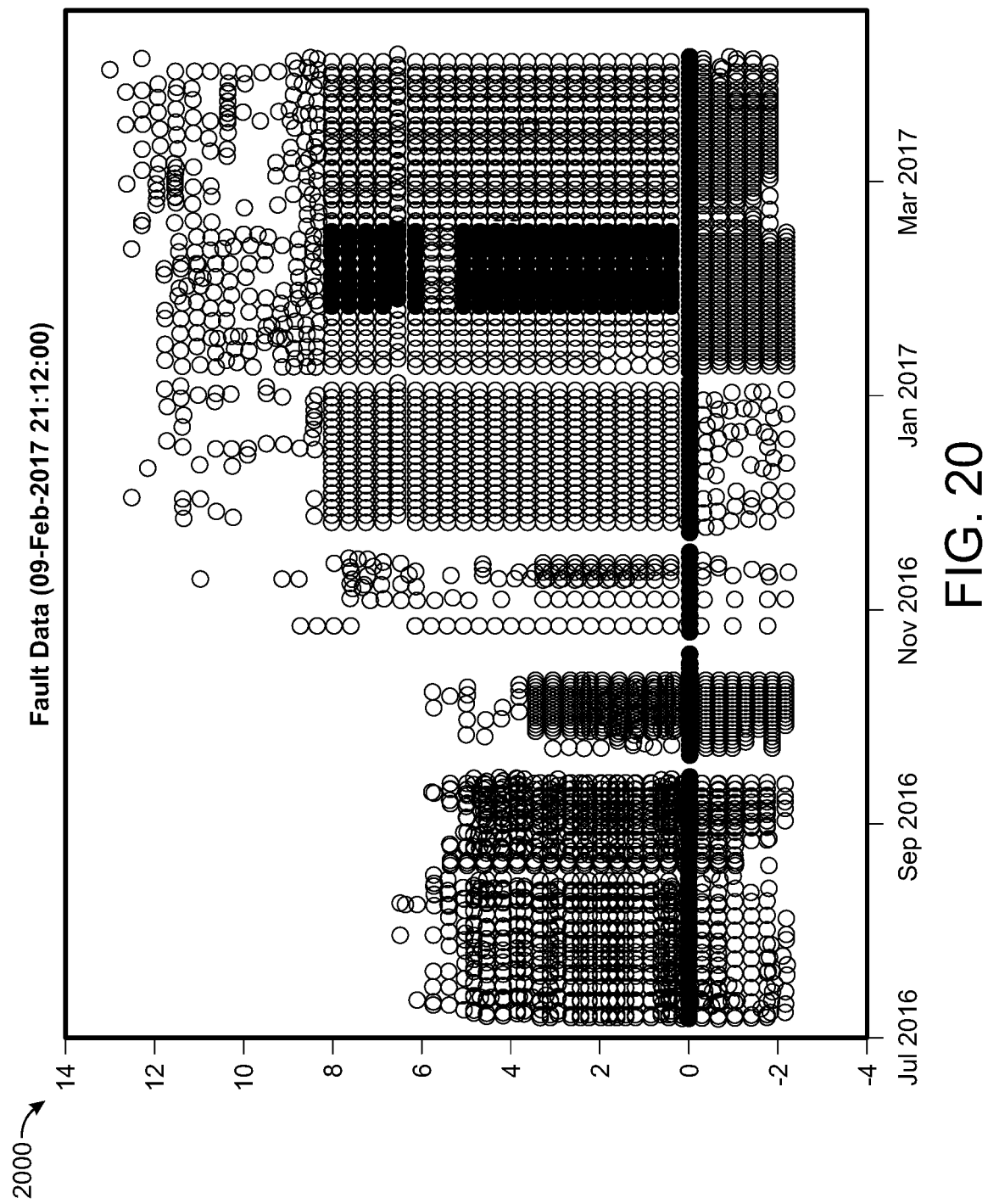
FIG. 20 is a diagram of a data plot shown time series data in a fault detection system, which can be generated by the controller of FIG. 6, according to some embodiments.
Figure 21:
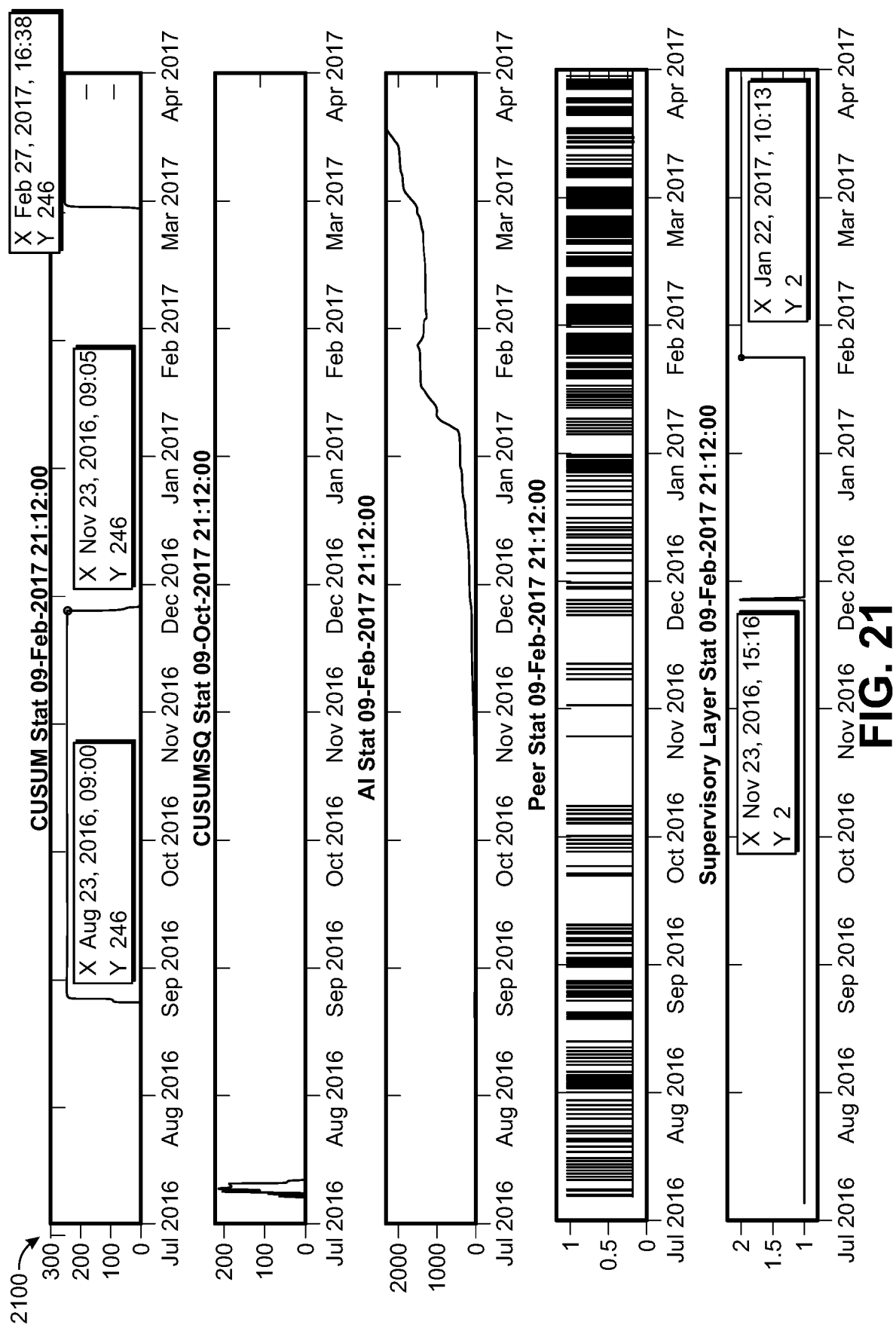
FIG. 21 is a diagram of data plots from analyzing time series data to detect faults, which can be implemented by the controller of FIG. 6, according to some embodiments.

Referring now to FIG. 18, a diagram 1800 showing an abrupt fault injected into otherwise typical operational data at about 35% of the data is shown, according to exemplary embodiments. FIG. 19 showing diagram 1900 shows the various components of fault adaptive controller 602 analyzing the data. In diagram 1900, the CUSUM plot (top) has a large false positive region, and the supervisory layer 510 is not able to as quickly detect the fault as in other embodiments. Referring now to FIG. 20, a diagram 2000 showing an abrupt fault injected into otherwise typical operational data at about 80% of the data is shown, according to exemplary embodiments. FIG. 21 showing diagram 2100 shows the actions of fault adaptive controller 602 when analyzing the data in diagram 2000.

Diagram 2100 shows CUSUM functionality has a fault positive for a period of time (e.g., about 3 months) before the fault is injected, including the time period over the actual fault. After the fault is injected, CUSUM functionality clears the fault for a period of time prior to re-identifying the fault. Supervisory layer 510 provides a false positive several months before the fault is injected, and provides another false positive several days before the fault is injected.

Power Estimation Optimization

Figure 22:
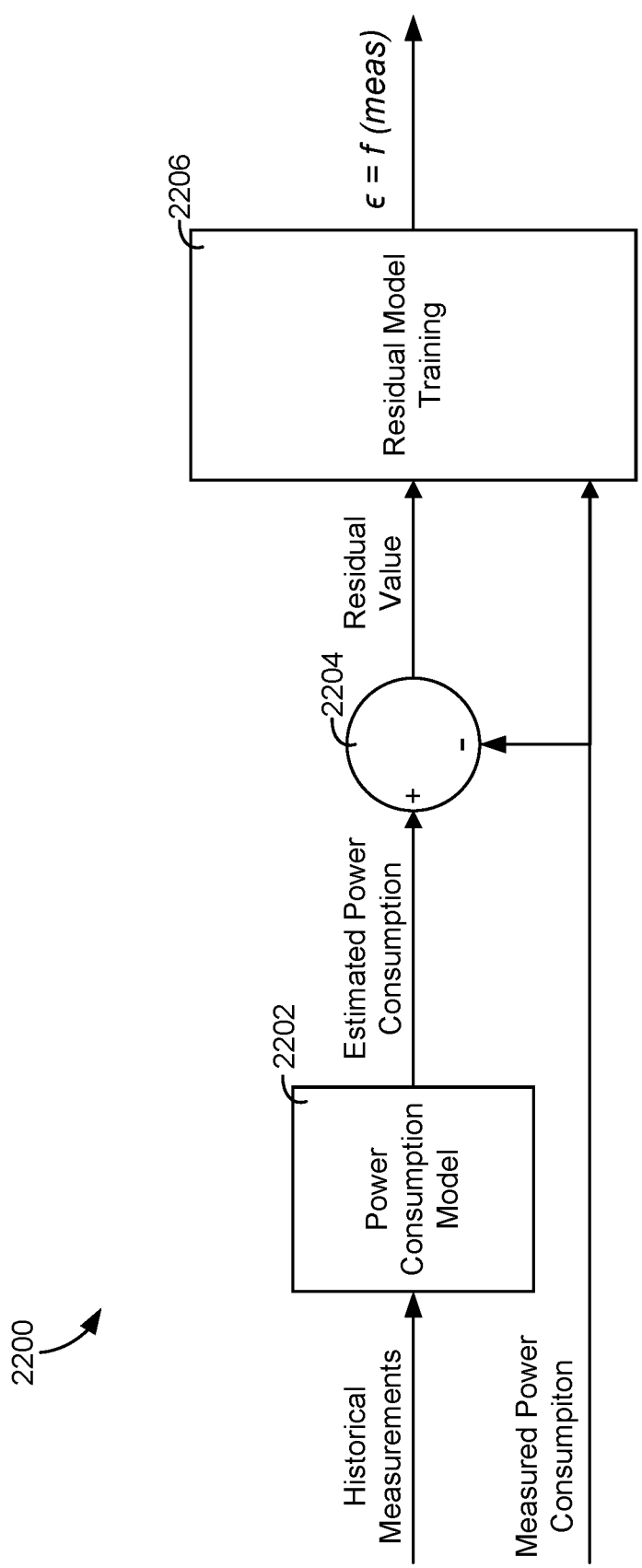
FIG. 22 is a block diagram for training a residual model that can be performed by the controller of FIG. 6, according to some embodiments.
Figure 23:
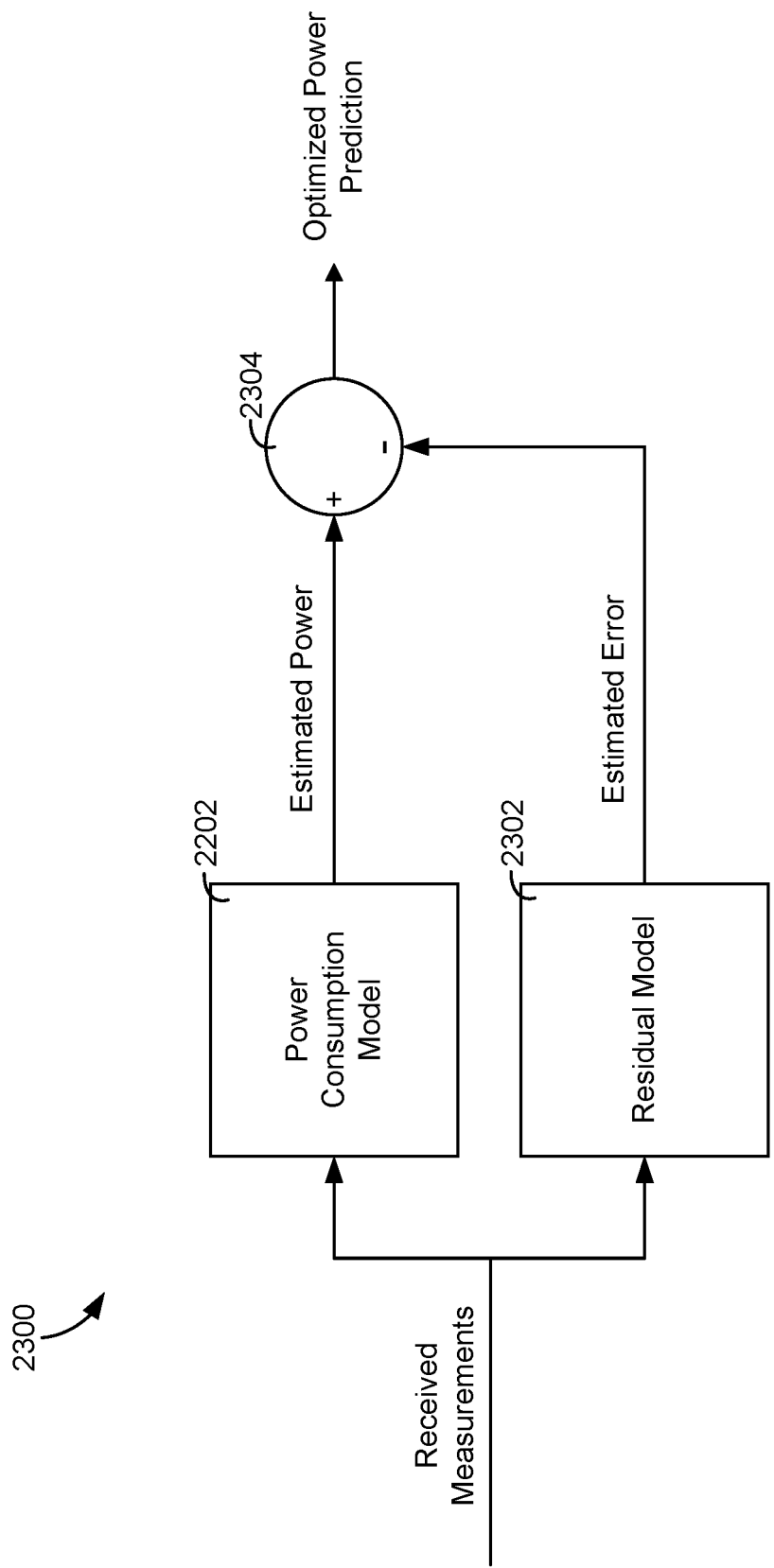
FIG. 23 is a block diagram for optimizing power estimations which can be performed by the controller of FIG. 6, according to some embodiments.
Figure 24:
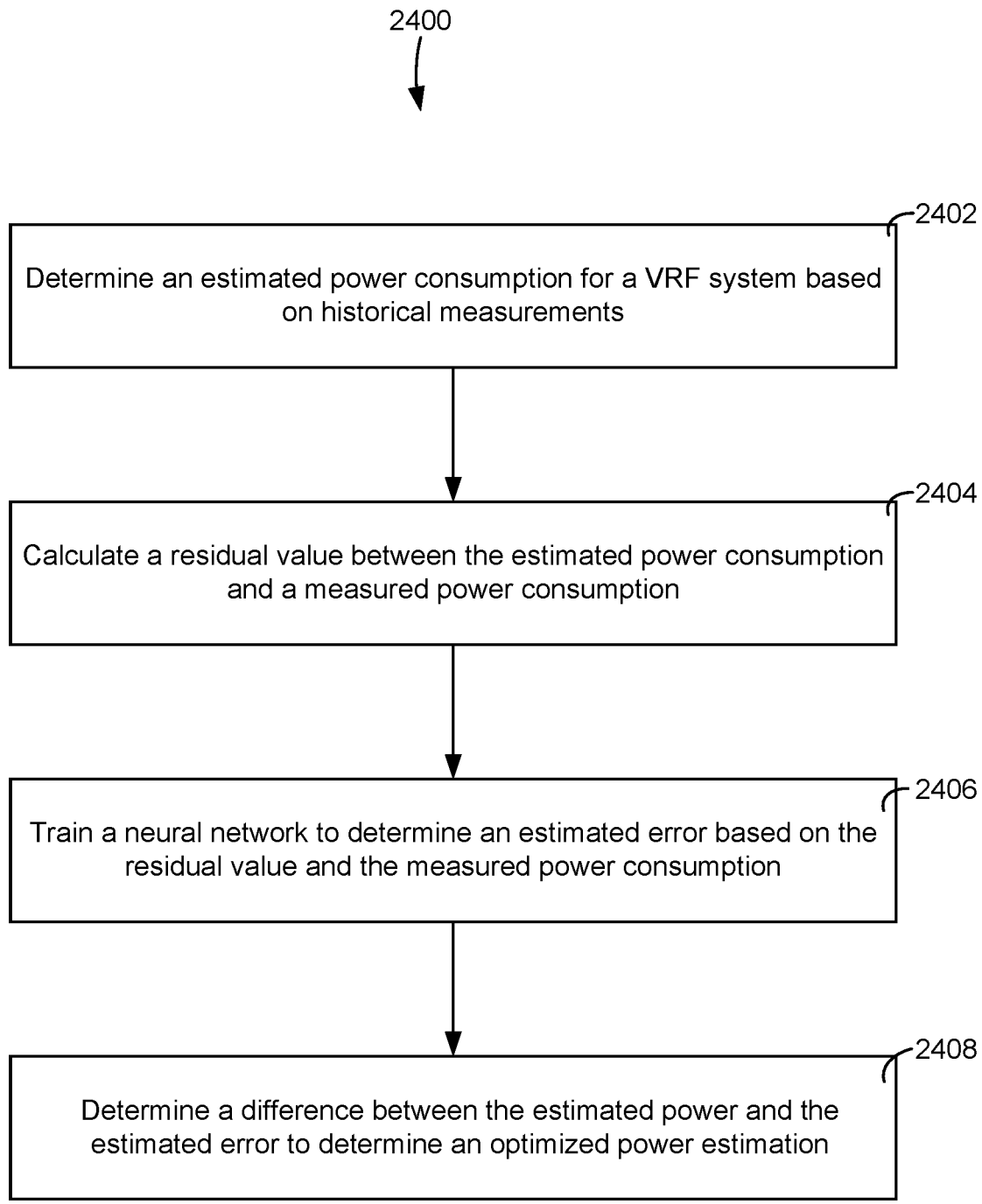
FIG. 24 is a flow diagram of a process for detecting faults in a building management system, which can be implemented by the controller of FIG. 6, according to some embodiments.

Referring now to FIGS. 22-24, systems and methods for optimizing power estimation levels are shown, according to exemplary embodiments. In some embodiments, the systems and methods described with reference to FIGS. 22-24 may be used in combination with the systems and methods described in U.S. patent application Ser. No. 16/899,220 filed Jun. 11, 2020, the entire disclosure of which is incorporated by reference herein. The systems and methods described therein provide a model that maps equipment degradation to operating performance using artificial intelligence (AI). Operating performance can be characterized by a model that relates the amount of resources consumed by the equipment (e.g., electricity, water, natural gas, etc.) to the amount of output resources produced by the equipment (e.g., hot water, cold water, heating load, cooling load, etc.) at a given time. Such a model can be characterized by a vector of model coefficients or parameters. The coefficients or parameters of the model may change as the equipment degrades. Accordingly, examining the relationship between degradation and model coefficients may allow for a mapping to be generated therebetween. The model and other predictions may be optimized by the predictive optimization techniques disclosed below with reference to systems 2200, 2300. For example, the degradation model predictions may incorporate the residual (e.g., error) estimations to better optimize the degradation predictions.

In some embodiments, a model configured to determine a residual value of expected and measured values is generated. The model may be trained on estimated power consumption levels and actual power consumption levels. The model may then provide estimated error between the measured power consumption levels and the estimated error. The estimated error can then be compared to the estimated power consumption to determine a more accurate power estimation level.

While the systems and methods described in FIGS. 22-24 relate particularly to HVAC systems and more particularly to variable refrigerant flow (VRF) systems, these are merely meant to be exemplary embodiments and are not intended to be in any way limiting. Accordingly, the implementations, processes, and/or systems may be implemented across various building management systems (e.g., lighting, fire safety, security, electrical, etc.). Similarly, while the systems and methods described in FIGS. 22-24 are directed towards determining residual values, estimated errors, and estimated levels of power consumption, these methods may be implemented for various other device parameters and are not limited to power consumption levels. For example, system 2200 may be directed to optimizing operating voltage estimations for chillers in an HVAC system.

Residual Model Training

Referring now to FIG. 22, system 2200 configured to train a residual model is shown, according to some embodiments. System 2200 and the various methods implemented therein may be performed by one or more controllers described herein. For example, system 2200 may merely include various functional blocks (e.g., power consumption model 2202, etc.) for providing training data to a residual model and training the residual model to output estimated errors in power consumption levels. System 2200 is shown to include power consumption model 2202, summing junction 2204, and residual model training module 2206.

Power consumption model 2202 may be configured to receive historical measurements from data 502 or another data source and determine one or more trends, models, or predictions for future received measurements. In some embodiments, this is performed using neural network functionality or another type of AI functionality. Power consumption model 2202 may receive historical measurements of a VRF system and determine power consumption levels. For example, power consumption model 2202 determines estimated power levels for a heat pump system in the VRF system. Power consumption model 2202 is shown to provide estimated power consumption levels to summing junction 2204.

Summing junction 2204 may act as a summing tool configured to receive estimated power consumption levels and measured power consumption levels to determine a difference between the levels. As described above, a difference between estimated and measured levels may be referred to as a residual value/calculation. Summing junction 2204 may calculate the residual value between the estimated power consumption levels and the measured power consumption levels and provide the residual value to residual model training module 2206 as training data.

Residual model training module 2206 may be configured to receive residual values from summing junction 2204 and training a neural network to estimate residual values. In some embodiments, the received residual values are errors between the estimated power consumption levels and measured power consumption levels. In some embodiments, residual model training module 2206 attempts to estimate these error levels by using the residual values as training data. Residual model training module 2206 may implement neural network or AI functionality to perform these functions.

Optimized Power Prediction

Referring now to FIG. 23, a system 2300 for optimizing power predictions in a VRF system is shown, according to exemplary embodiments. System 2300 may utilize the residual model training performed in FIG. 22, incorporate that training into a residual model (e.g., residual model 2302) and use the residual model in combination with estimated power consumption levels to determine an estimated power consumption level that is optimized (e.g., due to the consideration of estimated residual value from the residual model). System 2300 is shown to include power consumption model 2202, residual model 2302, and summing junction 2304.

Power consumption model 2202 may be configured in a similar fashion as it is described above in system 2200. In some embodiments, power consumption model 2202 receives measured (e.g., actual) data measurements (e.g., power readings from a heat pump system in a VRF system, power readings from indoor units in a VRF system, power readings from outdoor units in a VRF system, power readings from a heat recovery system in a VRF system, etc.) and determine estimated power consumption levels based on the received measurements. Power consumption model 2202 is shown to provide estimated power consumption levels to summing junction 2304.

Residual model 2302 may incorporate some or all of the features of residual model training module 2206 as described above with reference to FIG. 22. In some embodiments, residual model 2302 receives measured data (similar to power consumption model 2202) and determines an estimated error based on the received data. Residual model 2302 may only be able to perform this functionality after residual model 2302 has been trained (e.g., via the training methods disclosed above for residual model training module 2206). Once residual model 2302 has been trained, it can directly receive raw data measurements and determine residual values (e.g., estimated errors) for the received measurements. Residual model 2302 is shown to provide the estimated error values to summing junction 2304. In some embodiments, these error levels are the estimated error levels in estimated the estimated power consumption levels, as the estimated error levels are generated based on both a residual and the measured power consumption levels.

Summing junction 2304 is shown to take calculate a difference between the estimated power consumption levels and estimated error levels in the estimated power consumption levels. In some embodiments, this difference represents the estimated power consumption levels with an estimated error in the estimation accounted for, thus providing a more optimized power consumption estimation. In some embodiments, the optimized power consumption estimation is provided to supervisory layer 510 for further processing and/or control decisions, or to another control module for implementing control decisions based on estimated power consumption levels.

Referring now to FIG. 24, a process 2400 for optimizing power predictions in a VRF system is shown, according to exemplary embodiments. Process 2400 may be performed by any of the various processing circuits and/or controllers described herein. For example, process 2400 is performed by fault adaptive controller 602.

Process 2400 is shown to include determining an estimated power consumption for a VRF system based on historical measurements (step 2402). In some embodiments, this is performed by power consumption model 2202. Power consumption model 2202 is shown to provided estimated power consumption levels to junction block 2204 for determining estimated error levels.

Process 2400 is shown to include calculating a residual value between the estimated power consumption and a measured power consumption (step 2404) and training a neural network to determine an estimated error based on the residual value and the measured power consumption (step 2406). Junction block 2204 may receive the estimated power consumption levels and measured power consumption levels to generate a residual value (e.g., error value) for the received data. This may be used to optimize power consumption estimates after the residual model is trained. Junction block 2204 provides the residual value to another junction block 2304, in some embodiments.

Process 2400 is shown to include determining a difference between the estimated power and the estimated error to determine an optimized power estimation (step 2408). In some embodiments, junction block 2304 calculates a difference between the estimated power consumption levels and the estimated error levels to determine a more optimal power consumption estimation. Compared to the estimated power consumption levels generated by power consumption model 2022, optimized power predictions provided by junction block 2304 are more accurate, as estimated error levels from residual model 2302 are taken into account.

As referred to herein, a BMS can refer to an entire BMS or any components therein. For example, the term BMS can refer to equipment within a building, parts of the BMS (e.g. the network, the protocols, etc.) and some or all equipment within a building, or any combination thereof.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for detecting faults in a building management system (BMS), the method comprising:
receiving time series data characterizing an operating performance of one or more BMS devices;
generating a first fault detection result by processing the time series data using a first fault detection technique;
generating a second fault detection result by processing the time series data using a second fault detection technique different than the first fault detection technique, wherein the second fault detection result conflicts with the first fault detection result;
applying both the first fault detection result and the second fault detection result as inputs to a neural network configured to output an indication of whether a fault condition is occurring in the BMS; and
initiating an action to resolve the fault condition in response to the indication indicating that the fault condition is occurring in the BMS,
wherein processing the time series data using the second fault detection technique comprises using a temporal detection method comprising:
determining an expected value of the time series data based on inferences made by a regression model;
calculating a residual value between an actual value of the time series data and the expected value of the time series data;
generating statistical inferences based on the residual value; and
providing the statistical inferences as the second fault detection result, and
wherein generating the statistical inferences based on the residual value comprises generating a cumulated sum (CUSUM) of the time series data or cumulated sum squared (CUSUMSQ) of the time series data or a recursive residual of the time series data.

2. The method of claim 1, wherein processing the time series data using the first fault detection technique comprises executing an artificial intelligence (AI) fault detection method comprising:
determining a second expected value of the time series data based on second inferences made by a second neural network;
calculating a second residual value between the actual value of the time series data and the second expected value of the time series data;
generating second statistical inferences based on the second residual value; and
providing the second statistical inferences as the first fault detection result.

3. The method of claim 2, wherein generating the second statistical inferences based on the second residual value comprises generating at least one of a mean squared error of the second residual value or a determinant of a covariance of the second residual value.

4. The method of claim 1, wherein processing the time series data using the first fault detection technique comprises using a peer fault detection method to identify whether the one or more BMS devices are operating atypically by:
comparing the time series data to performance metrics of the one or more BMS devices to determine that the one or more BMS devices are operating atypically, the time series data including operational data relating to the one or more BMS devices; and
providing the first fault detection result in response to determining that the one or more BMS devices are operating atypically.

5. The method of claim 1, where the neural network is at least one of: a feed forward neural network, a convolutional neural network, a long short term neural network, or a recurrent neural network.

6. The method of claim 1, wherein the neural network is trained using historical user confirmed faults and a plurality of historical fault detection results generated using the first fault detection technique and the second fault detection technique.

7. The method of claim 1, wherein applying both the first fault detection result and the second fault detection result as the inputs to the neural network comprises adding additional inputs of at least one of an outdoor environmental condition, day of the week, or time of day.

8. The method of claim 1, wherein processing the time series data using the first fault detection technique comprises:
using a peer fault detection method to identify whether the one or more BMS devices operate atypically by calculating one or more performance metrics of the one or more devices;
calculating device statistics for each of the one or more devices;
determining the device statistics exceed a critical value; and
providing one of the multiple fault detection results in response to determining that the one or more device statistics of the BMS have exceeded the critical value.

9. The method of claim 1, wherein initiating the action to resolve the fault condition comprises scheduling maintenance.

10. One or more non-transitory computer-readable media having computer-executable instructions stored thereon that, when executed by one or more processors, cause the one or more processors to perform operations comprising:

receiving time series data characterizing an operating performance of one or more BMS devices;

generating a first fault detection result by processing the time series data using a first fault detection technique;

generating a second fault detection result by processing the time series data using a second fault detection technique different than the first fault detection technique, wherein the second fault detection result conflicts with the first fault detection result;

applying both the first fault detection result and the second fault detection result as inputs to a neural network configured to output an indication of whether a fault condition is occurring in the BMS; and initiating an action to resolve the fault condition in response to the indication indicating that the fault condition is occurring in the BMS, wherein processing the time series data using the second fault detection technique comprises using a temporal detection method comprising:

determining an expected value of the time series data based on inferences made by a regression model;

calculating a residual value between an actual value of the time series data and the expected value of the time series data;

generating statistical inferences based on the residual value; and providing the statistical inferences as the second fault detection result, and wherein generating the statistical inferences based on the residual value comprises generating a cumulated sum (CUSUM) of the time series data or cumulated sum squared (CUSUMSQ) of the time series data or a recursive residual of the time series data.

11. The media of claim 10, wherein processing the time series data using the first fault detection technique comprises executing an artificial intelligence (AI) fault detection method comprising:

determining a second expected value of the time series data based on second inferences made by a second neural network;

calculating a second residual value between the actual value of the time series data and the second expected value of the time series data;

generating second statistical inferences based on the second residual value; and providing the second statistical inferences as the first fault detection result.

12. The media of claim 11, wherein generating the second statistical inferences based on the second residual value comprises generating at least one of a mean squared error of the second residual value or a determinant of a covariance of the second residual value.

13. The media of claim 10, wherein processing the time series data using the first fault detection technique comprises using a peer fault detection method to identify whether the one or more BMS devices operating atypically by:

generating a model of typical operation of the one or more BMS devices;

comparing the time series data to the model of typical operation to determine whether the one or more BMS devices are operating atypically, the time series data including operational data relating to the one or more BMS devices; and providing the first fault detection result in response to determining that the one or more BMS devices are operating atypically.

14. A controller comprising one or more processors and memory storing instructions that, when executed by the one or more processors, cause the one or more processors to perform operations comprising:

receiving time series data characterizing an operating performance of one or more BMS devices;

generating a first fault detection result by processing the time series data using a first fault detection technique;

generating a second fault detection result by processing the time series data using a second fault detection technique different than the first fault detection technique, wherein the second fault detection result conflicts with the first fault detection result;

applying both the first fault detection result and the second fault detection result as inputs to a neural network configured to output an indication of whether a fault condition is occurring in the BMS; and initiating an action to resolve the fault condition in response to the indication indicating that the fault condition is occurring in the BMS, wherein processing the time series data using the second fault detection technique comprises using a temporal detection method comprising:

determining an expected value of the time series data based on inferences made by a regression model;

calculating a residual value between an actual value of the time series data and the expected value of the time series data;

generating statistical inferences based on the residual value; and providing the statistical inferences as the second fault detection result, and wherein generating the statistical inferences based on the residual value comprises generating a cumulated sum (CUSUM) of the time series data or cumulated sum squared (CUSUMSQ) of the time series data or a recursive residual of the time series data.

15. The controller of claim 14, wherein processing the time series data using the first fault detection technique comprises using an artificial intelligence (AI) fault detection method comprising:

determining a second expected value of the time series data based on second inferences made by a second neural network;

calculating a second residual value between the actual value of the time series data and the second expected value of the time series data;

generating second statistical inferences based on the second residual value; and providing the second statistical inferences as the first fault detection result.

16. The controller of claim 14, wherein initiating the action to resolve the fault condition comprises scheduling maintenance.

* * * * *